US011431388B2

United States Patent
Arya et al.

(10) Patent No.: US 11,431,388 B2
(45) Date of Patent: Aug. 30, 2022

(54) WAVELET TRANSFORM-BASED TRACKING FOR ESTIMATING AN AGING WIRELESS CHANNEL

(71) Applicant: QUALCOMM Incorporated, San Diego, CA (US)

(72) Inventors: Vikas Arya, Hyderabad (IN); Shubham Kshiteesh Mishra, Hyderabad (IN); Anil Kumar Allada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/069,636

(22) Filed: Oct. 13, 2020

(65) Prior Publication Data

US 2022/0116081 A1  Apr. 14, 2022

(51) Int. Cl.
*H04B 7/02* (2018.01)
*H04B 7/0456* (2017.01)
*H04L 25/02* (2006.01)

(52) U.S. Cl.
CPC ....... *H04B 7/0456* (2013.01); *H04L 25/0204* (2013.01); *H04L 25/0224* (2013.01)

(58) Field of Classification Search
CPC .............. H04B 7/0456; H04L 25/0224; H04L 25/0204
USPC ....................................................... 375/267
See application file for complete search history.

(56) References Cited

U.S. PATENT DOCUMENTS

| | | | |
|---|---|---|---|
| 2003/0139165 A1* | 7/2003 | Smith | G06F 17/148 455/296 |
| 2010/0262569 A1* | 10/2010 | Nakamura | G06N 3/049 706/12 |
| 2013/0163761 A1* | 6/2013 | Baras | H04W 12/106 380/270 |

OTHER PUBLICATIONS

Ruiguang Tang et al (A Haar Wavelet Decision Feedback Channel Estimation Method in OFDM Systems, Applied Sciences, May 26, 2018, 8,877, pp. 1 to 15).*
Appaiah et al., "Pilot Contamination Reduction in Multi-user TDD Systems," 2010 IEEE International Conference on Communications, Cape Town, 2010, pp. 1-5, doi: 10.1109/ICC.2010.5502810.
Arya et al., "Kalman Filter Based Tracking for Channel Aging in Massive MIMO Systems," IEEE 2018 International conference on signal processing and communications (SPCOM), Bangalore, Indian Institute of Science.

(Continued)

*Primary Examiner* — Helene E Tayong
(74) *Attorney, Agent, or Firm* — Quarles & Brady LLP/Qualcomm

(57) ABSTRACT

Aspects of the disclosure relate to channel estimation and tracking in a wireless communication system. A wireless communication entity estimates a received signal utilizing any suitable process. The wireless communication entity applies a Wavelet decomposition filter to the estimated received signal to generate a channel coefficient estimate. The Wavelet decomposition filter may be configured to employ a Haar mother Wavelet. The wireless communication entity generates a prediction of a future channel estimate at a later time, by characterizing the channel according to a first-order autoregressive model of channel aging. Other aspects, embodiments, and features are also claimed and described.

36 Claims, 10 Drawing Sheets

(56) References Cited

OTHER PUBLICATIONS

Jose et al., "Pilot Contamination and Precoding in Multi-Cell TDD System," IEEE Transactions on Wireless Communications, vol. 10, No. 8, pp. 2640-2651, Aug. 2011, doi: 10.1109/TWC.2011.060711. 101155.

Kashyap et al., "Performance Analysis of (TDD) Massive MIMO with Kalman Channel Prediction," Proceedings of IEEE Conference on Acoustics, Speech, and Signal Processing (ICASSP), New Orleans, USA, Mar. 2017, 3554-3558, 10.1109/ICASSP.2017.7952818.

Truong et al., "Effects of Channel Aging in Massive MIMO Systems," Journal of Communications and Networks, vol. 15, No. 4, pp. 338-351, 2013, retrieved from https://arxiv.org/pdf/1305.6151.

International Search Report and Written Opinion—PCT/US2021/050488—ISAEPO—Jan. 4, 2022.

Yuan Yazhou et al: "A new channel estimation method based on GPR and wavelet denosing", 2019 3rd International Symposium on Autonomous Systems (ISAS), IEEE, May 29, 2019 (May 29, 2019) pp. 205-209.

Papazafeiropoulos Anastasios et al: "Linear precoding for downlink massive MIMO with delayed CSIT and channel prediction" 2014 IEEE Wireless Communications and Networking Conference (WCNC), IEEE, Apr. 6, 2014 (Apr. 6, 2014), pp. 809-914.

Hyou-Seok Lee et al: "Channel Estimation Based on a Time-Domain Threshold for OFDM Systems", IEEE Transactions on Broadcasting, IEEE Service Center, Piscataway, NJ, US, vol. 55, No. 3, Sep. 1, 2009 (Sep. 1, 2009), pp. 656-662.

Sirvi Sunita et al: "Wavelet based OFDM system over flat fading channel using NLMS equalization" 2016 International Conference on Computing, Communication and Automation (ICCCA), IEEE, Apr. 29, 2016 (Apr. 29, 2016), pp. 1460-1463.

* cited by examiner

WAVELET TRANSFORM-BASED TRACKING FOR ESTIMATING AN AGING WIRELESS CHANNEL

TECHNICAL FIELD

The technology discussed below relates generally to wireless communication systems, and more particularly, to channel estimation corresponding to an aging wireless channel.

INTRODUCTION

Modern wireless communication systems frequently employ multi-antenna technology for a variety of reasons. Some examples of multi-antenna technology include beamforming, transmit diversity, and spatial multiplexing. One particular example of spatial multiplexing is a multi-input multi-output (MIMO) system, where a multi-antenna transmitter sends a signal to a multi-antenna receiver (or, in some examples, to multiple single-antenna receivers). By utilizing MIMO, a wireless communication system can exploit the spatial domain to multiply the throughput on a given channel. That is, when the different spatial signature of transmissions from different spatially-located antennas is combined with an analysis of the multipath nature of a channel, multiple different streams of data can be transmitted simultaneously on the same time-frequency resource.

However, such a MIMO system relies on an accurate channel estimate to characterize a multipath channel. In many systems, a channel, estimate can be generated by way of the measurement of a suitable pilot signal over the channel. While channel estimation can be done with such a pilot signal, the accuracy of the estimate may be hindered by interference, noise, and channel aging.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure provides for accurate generation of a channel estimate indicating features of a wireless channel between transmitting and receiving devices. In some aspects, a Wavelet transform (e.g., a Wavelet-Haar transform) may be employed to generate an accurate channel estimate despite the presence of pilot contamination. In further aspects, a channel aging predictor (e.g., configured according to a first-order autoregressive model of channel aging) may be employed to generate an accurate prediction of a future channel estimate despite channel aging, or changes in channel characteristics over time, e.g., resulting from a Doppler shift associated with moving devices.

In some aspects, the present disclosure provides a method, a computer-readable medium storing code, and an apparatus (e.g., a wireless communication entity) for channel estimation. A wireless communication entity receives a reference signal and generates a received signal estimate based on the received reference signal. The wireless communication entity then generates a channel coefficient estimate based on a wavelet decomposition of the received signal estimate. The wireless communication entity further generates a prediction of a future channel coefficient based on the channel coefficient estimate.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
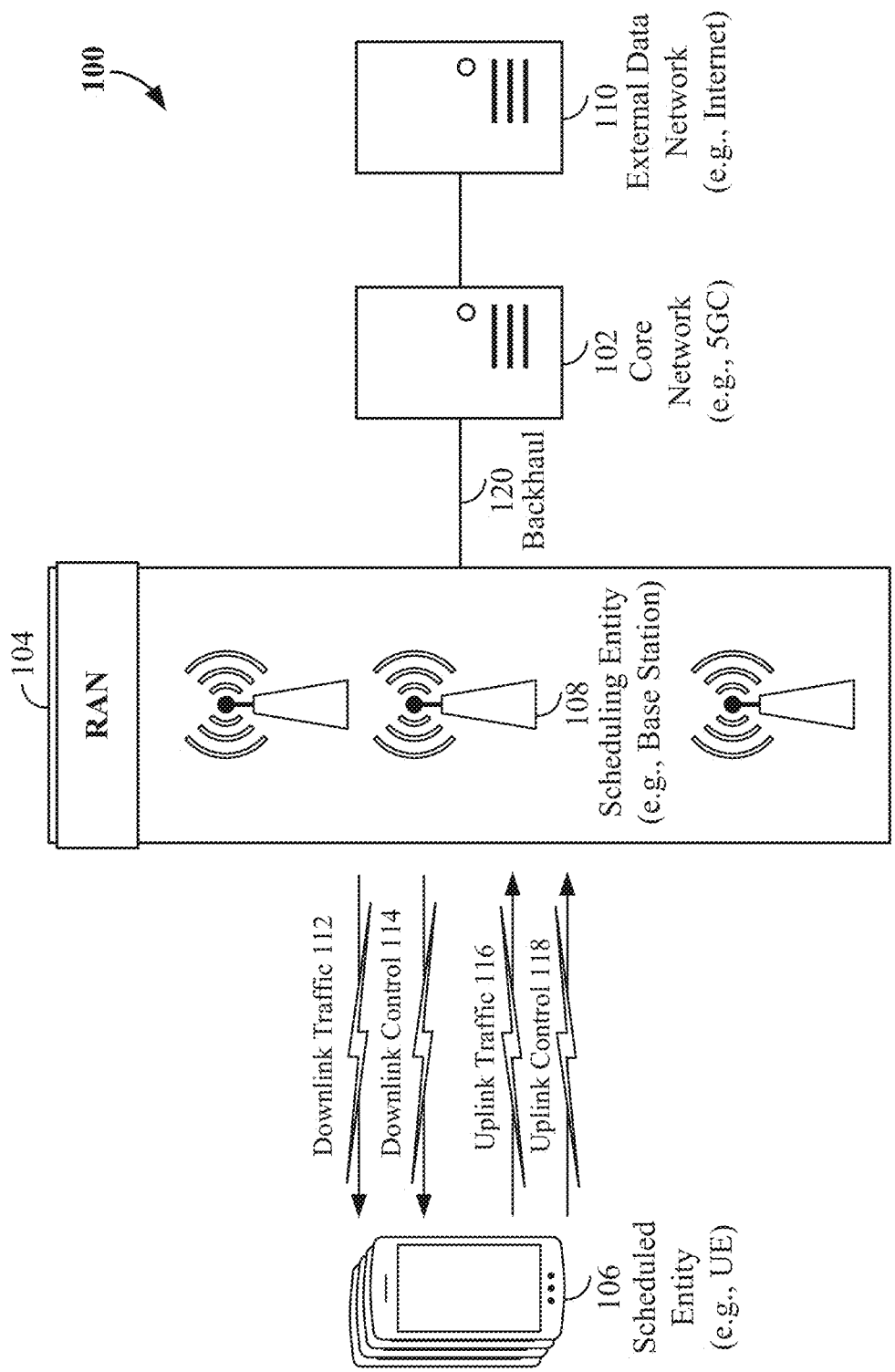
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a wireless communication entity, a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 supports wireless communication for multiple mobile apparatuses. A mobile apparatus may be referred to as user equipment (UE) in 3GPP standards, but may also be referred to by those skilled in the art as a wireless communication entity, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) or forward link transmission. In accordance with certain aspects of the present disclosure, the term downlink may refer to a point-to-multipoint transmission originating at a scheduling entity (described further below; e.g., a base station 108). Another way to describe this scheme may be to use the term broadcast channel multiplexing. Transmissions from a UE (e.g., a UE 106) to a base station (e.g., a base station 108) may be referred to as uplink (UL) or reverse link transmissions. In accordance with further aspects of the present disclosure, the term uplink may refer to a point-to-point transmission originating at a scheduled entity (described further below; e.g., a UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs or other wireless communication entities).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
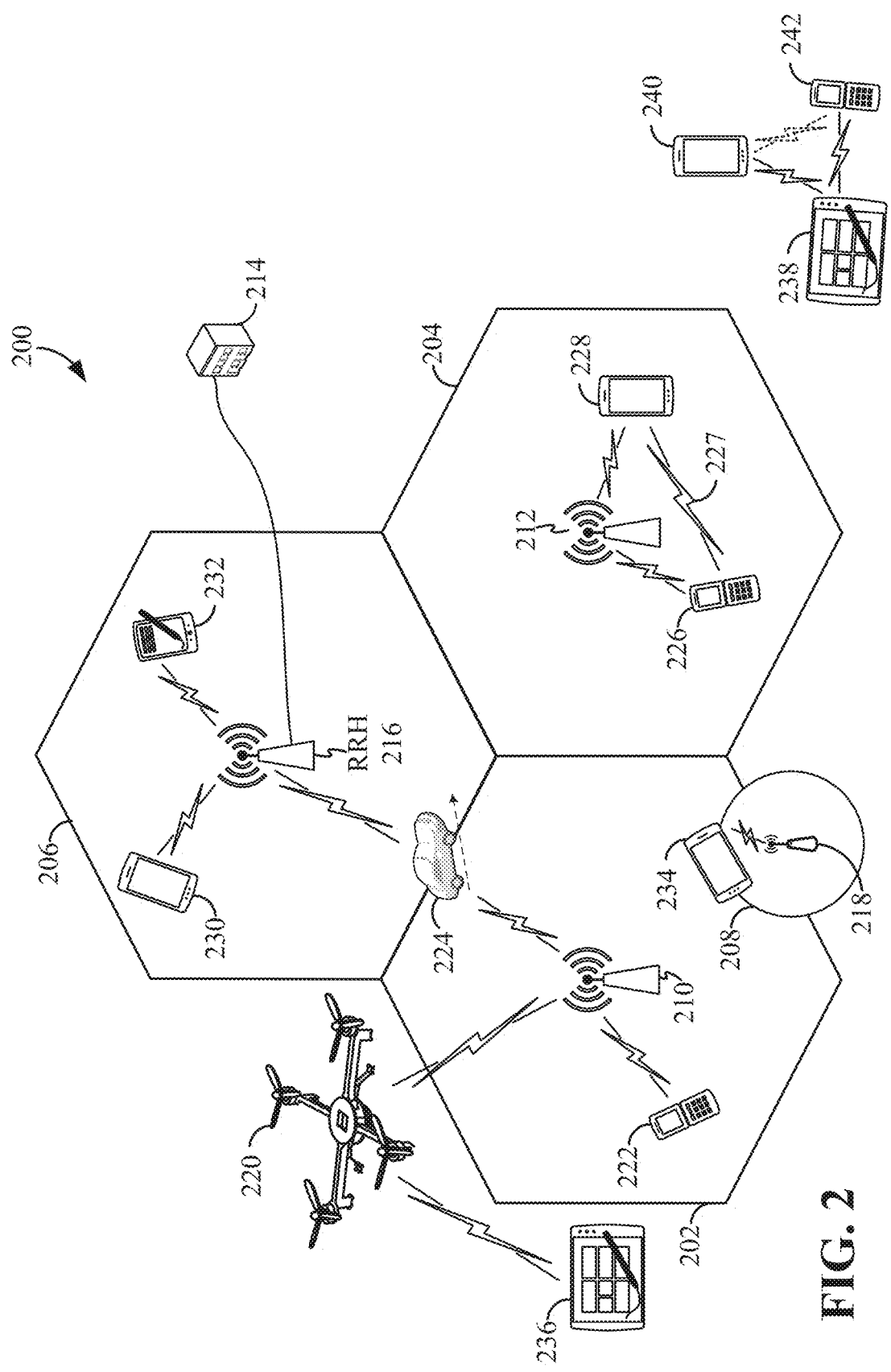
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be configured according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of UEs. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station 210 may multiplex DL transmissions to UEs 222 and 224 utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

MIMO/Beamforming

Figure 3:
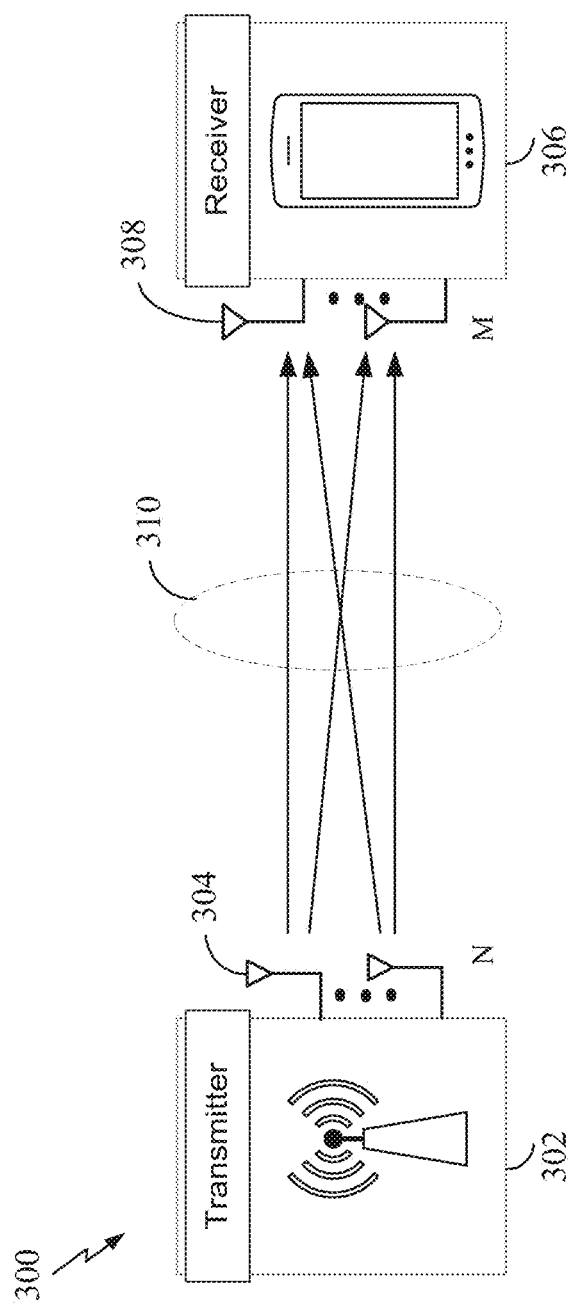
FIG. 3 is a block diagram illustrating a wireless communication system supporting beamforming and/or multiple-input multiple-output (MIMO) communication.

In some aspects of the disclosure, a scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, the amplitude and phase of each antenna in an array of antennas may be precoded, or controlled to create a desired (e.g., directional) pattern of constructive and destructive interference in the wavefront. In a MIMO system, a transmitter 302 includes multiple transmit antennas 304 (e.g., N transmit antennas) and a receiver 306 includes one or more receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter may send multiple data streams to a single receiver. In this way, a MIMO system takes advantage of capacity gains and/or increased data rates associated with using multiple antennas in rich scattering environments where channel variations can be tracked. Here, the receiver may track these channel conditions and provide corresponding feedback to the transmitter. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another. For example, in the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. The receiver may transmit feedback including, e.g., a quantized version of the channel so that the transmitter can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

Massive MIMO refers to a system where a base station having a very large number of N antennas serves a set of U users in a cell, where generally, the number of antennas is much greater than the number of users (e.g., N>>U). In some examples, each of the U users in a massive MIMO cell may utilize a single-antenna UE.

Channel State Information

In these multi-antenna systems, a transmitting device may determine the precoding to apply to a transmitted data stream or streams based, e.g., on known channel state information. For example, the transmitting device may transmit one or more suitable reference signals (e.g., a channel state information reference signal (CSI-RS) or sounding reference signal (SRS)) that the receiving device may measure. The receiver may then report measured channel state information (CSI) back to the transmitting device. Such a CSI report generally provides the current communication channel quality, and may indicate various channel properties such as multipath fading, scattering, signal power attenuation, etc. In some examples, a CSI report may further include parameters such as a requested transport block size (TBS) for future transmissions to the receiver, a precoding matrix indicator (PMI), etc., back to the transmitting device. A PMI generally reports the receiving device's preferred precoding matrix for the transmitting device to use, and may be indexed to a predefined codebook. The transmitting device may then utilize this CSI to determine a suitable precoding matrix for transmissions to the receiver.

In Time Division Duplex (TDD) systems, the UL and DL are often reciprocal, in that each respective direction uses different time slots of the same frequency bandwidth. Therefore, in TDD systems, a base station may precode DL MIMO transmissions or beamformed transmissions based on an estimate of the UL channel conditions (e.g., based on measurement of a sounding reference signal (SRS) or other pilot signal transmitted from the UE). Similarly, UL transmissions (e.g., UL beamforming, UL MIMO, and single-antenna UL transmissions in a massive MIMO system) may be configured according to an estimate of the DL channel conditions.

General Nomenclature

Figure 4:
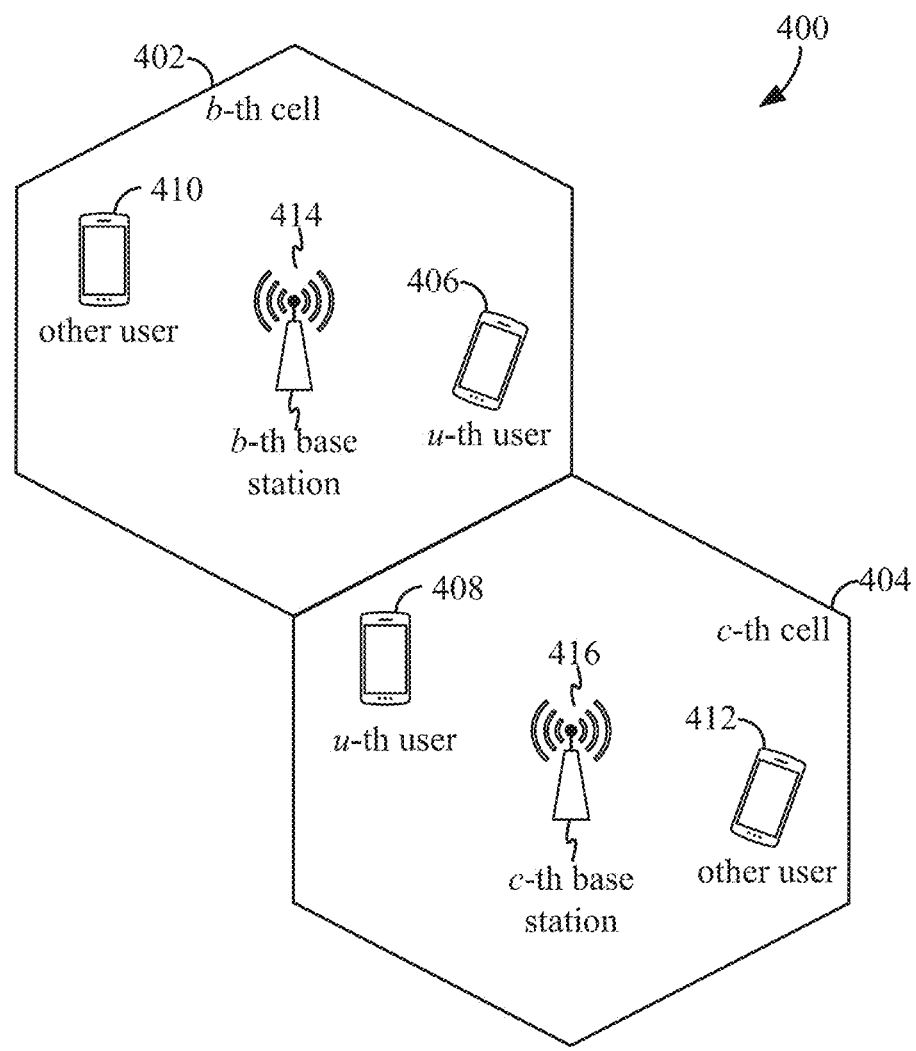
FIG. 4 is a conceptual illustration of an example of a radio access network employing massive MIMO according to some aspects.

Referring now to FIG. 4, an exemplary RAN 400 including two cells ($b^{th}$ cell 402 and $c^{th}$ cell 404) is illustrated, although those of ordinary skill in the art will recognize that the description that follows can readily be extended to a larger system with any suitable number of cells. In the RAN 400, there is a number U of users (e.g., single-antenna UEs) in each cell. Each user within a given cell may be labeled with a user index u, where $u \in \{0, 1, 2, \ldots, U-1\}$. In the illustrated example, four users (UEs 406, 408, 410, and 412) are illustrated. To illustrate that each cell includes the same number U of users, both of users 406 and 408 are labeled as the $u^{th}$ user of their respective cell. That is, a user 406 in one cell 402 may have the same user index u as a user 408 in another cell 404.

RAN 400 includes a number C of cells, each cell labeled with a cell index c, where $c \in \{0, 1, 2, \ldots, C-1\}$. Further, RAN 400 includes a number C of base stations (i.e., one base station corresponding to each cell), each base station labeled with a base station index b, where $b \in \{0, 1, 2, \ldots, C-1\}$.

In some examples, the RAN 400 may employ massive MIMO. Here, let N be the number of antennas at each base station 414 and 416, where N>>U.

Issue

Massive MIMO in particular relies on accurate channel estimation to generate a suitable precoding matrix to map a transmission signal to its antennas. However, channel estimation can face several challenges that may limit its accuracy. Among these challenges are included pilot contamination and channel aging.

For example, assume that a base station desires to generate a channel estimate by measuring an uplink transmission by one or more users in its cell. In this case, the accuracy of the base station's channel estimate may be significantly hampered by interfering transmissions made by users in different cells. To provide an illustration of this interference, FIG. 5 is a schematic illustration of a RAN 500 having generally the same two-cell configuration as the RAN 400 described above and illustrated in FIG. 4.

To obtain channel coefficients corresponding to a $u^{th}$ user 506 in a $b^{th}$ cell 502, a $b^{th}$ base station 514 may attempt to measure an uplink pilot (e.g., reference signal) transmission $\psi_{bu}$ from that user. As discussed further below, the uplink pilot transmission $\psi_{bu}$ may be a pilot sequence selected from a set $\Psi$ of U orthonormal pilot sequences. With this property, the pilot sequence $\psi_{bu}$ may be mutually orthogonal with all other pilot sequences in the set $\Psi$. Thus, although the $b^{th}$ base station 514 may receive uplink pilot transmissions from other users that use a different pilot sequence (not illustrated in FIG. 5 for clarity), those transmissions do not substantially interfere with the uplink pilot transmission $\psi_{bu}$ from the $u^{th}$ user 506 in the $b^{th}$ cell 502.

Figure 5:
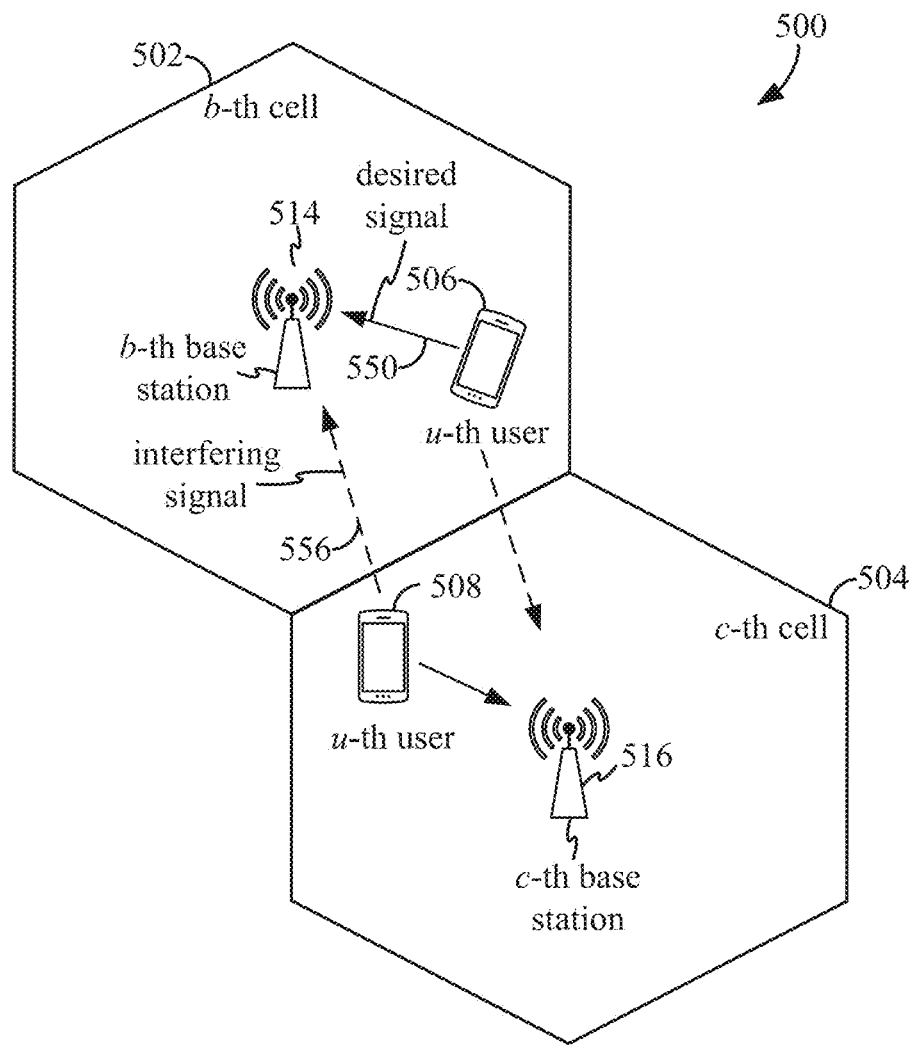
FIG. 5 is a conceptual illustration of a further example of a radio access network employing massive MIMO during a training stage, according to some aspects.

In FIG. 5, the uplink pilot transmission of interest to the $b^{th}$ base station 514 is illustrated with an arrow 550 having a continuous (i.e., non-broken) line. However, as discussed above, in some examples, users in the $b^{th}$ cell 502 may employ the same set of pilot sequences as users in all other cells in the RAN 500. Thus, the signal the $b^{th}$ base station 514 receives may include pilot contamination, or interference, in the form of an uplink pilot transmission 556 from users (e.g., the $u^{th}$ user 554) in adjacent cells (e.g., the $c^{th}$ cell 504) transmitting their own uplink pilots using the same pilot sequence.

Channel aging is another issue that can affect the accuracy of a channel estimate. That is, channel coefficients may change over time, e.g., caused by a moving user or any other reason. Therefore, at the time instant when a base station applies its estimated channel coefficients, e.g., for precoding a downlink transmission, the time instant at which the base station generated the channel coefficients has passed, potentially resulting in channel estimation error.

In particular, because massive MIMO demands significant and potentially time-consuming processing resources, the channel can experience substantial aging between the time when a base station generates a channel estimate and the time the base station uses the channel estimate for precoding. This issue is further exacerbated as modern networks use higher and higher frequencies for wireless communication (e.g., mmW). That is, at high frequencies, the coherence time, or the time interval at which the channel estimate remains substantially flat or constant, is very low.

One scheme for addressing channel aging with a low coherence time at very high frequencies is simply to generate a channel estimate more frequently. However, this approach results in increased overhead for pilot transmissions and CSI feedback, and can decrease the throughput in a cell. Another approach for addressing channel aging is to employ channel prediction, attempting to anticipate the channel aging. However, the effectiveness of previously existing channel prediction algorithms has been less than optimal.

Prior Approaches and their Shortcomings

To address pilot contamination, known existing approaches include the use of a multi-cell minimum mean squared error (MMSE)-based precoding, which depends on the set of training sequences that users use for their pilot transmissions; and the use of a linear minimum mean squared error (LMMSE) filter to generate a channel estimate. And to address channel aging, known existing designs include channel prediction by using a finite impulse response (FIR) Wiener predictor. However, this filter is an ideal filter, which cannot be practically implemented. Another approach includes the use of a Kalman filter for channel prediction. While practical, this approach may still result in less than ideal channel predictions.

Known existing schemes do not address both pilot contamination and channel aging. And moreover, these existing schemes may rely on one or more unrealistic assumptions, such as that the base station fully knows the channel correlation statistics and path loss matrix; that all users move at the same speed; or that all users experience the same environmental variations in their channels. Therefore, there is room in the field for a further approach to channel estimation that can address both pilot contamination and channel aging in a practical manner, and without relying on the above-described unrealistic assumptions.

Example Apparatus Structural Block Diagram

In some aspects, the present disclosure provides an approach to channel estimation that employs a wavelet-Haar transform. As discussed below, the wavelet-Haar transform-based channel estimation can provide improved accuracy of a channel state estimate (e.g., reduced RMSE error) relative to previous designs, with improved performance across wide Doppler spreads/user velocities. Further, this approach need not rely on assumptions such as that the base station has perfect knowledge of the channel correlation statistics and path loss matrix, that all users move at the same speed, or that all users experience the same environmental variations. And moreover, the wavelet-Haar transform-based channel estimation can simultaneously deal with both channel aging and pilot contamination in an effective way.

Figure 6:
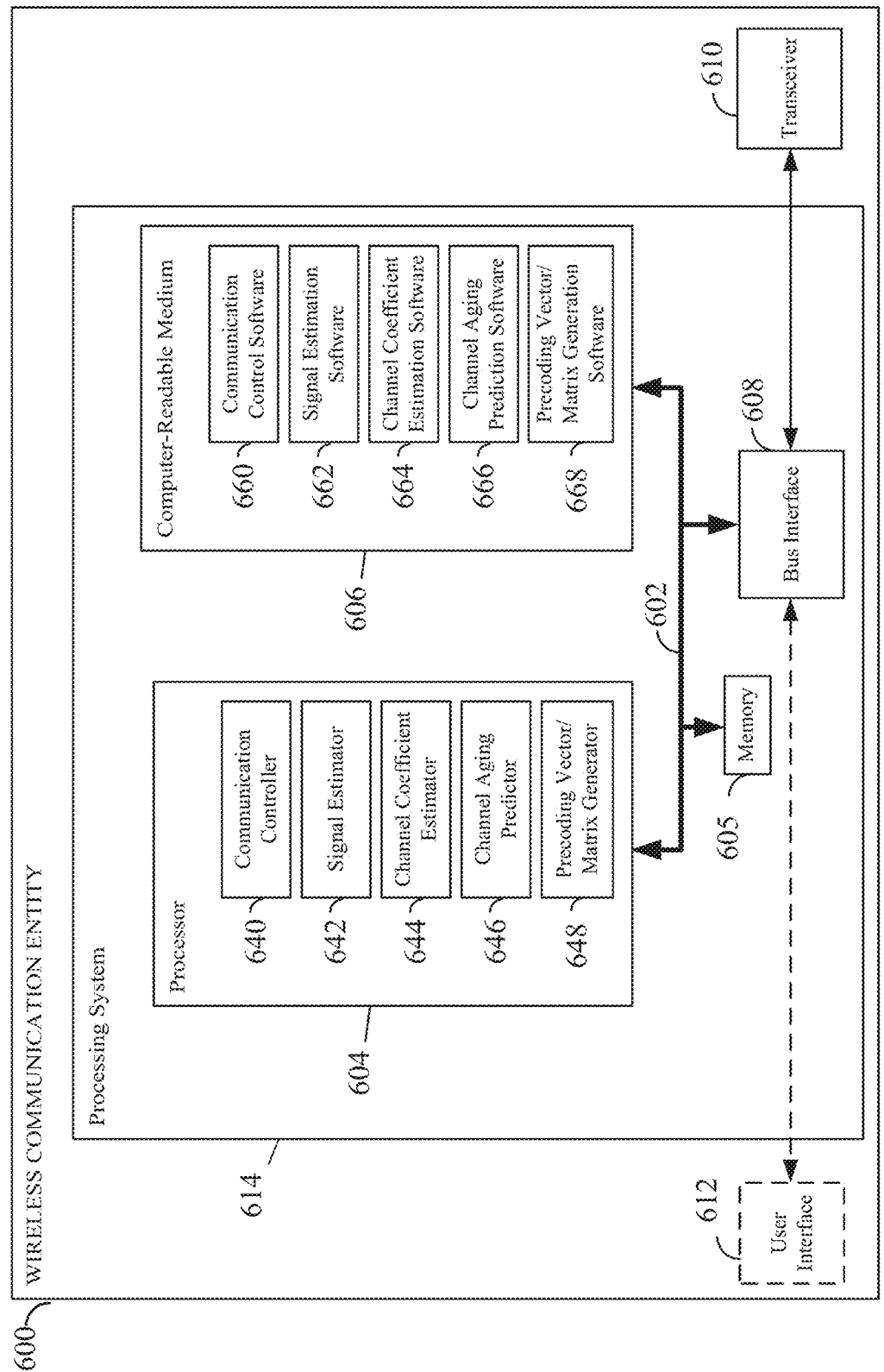
FIG. 6 is a block diagram illustrating an example of a hardware implementation for a wireless communication entity according to some aspects of the disclosure.

FIG. 6 is a block diagram illustrating an example of a hardware implementation for a wireless communication entity 600 employing a processing system 614. For example, the wireless communication entity 600 may be a user equipment (UE) or scheduled entity as illustrated in any one or more of FIGS. 1, 2, 3, 4, 5, and/or 7. In another example, the wireless communication entity 600 may be a base station or scheduling entity as illustrated in any one or more of FIGS. 1, 2, 3, 4, 5, and/or 7.

The wireless communication entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication entity 600 may be configured to perform any one or more of the functions described herein. That is, the processor 604, as utilized in a wireless communication entity 600, may be configured (e.g., in coordination with the memory 605 and/or transceiver 610) to implement any one or more of the processes and procedures described below and illustrated in FIGS. 8, 9, and/or 10.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the wireless communication entity 600, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include a communication controller 640 configured (e.g., in coordination with the memory 605 and the transceiver 610) for various functions, including, e.g., transmitting and/or receiving reference signals (e.g., composite training signals), transmitting and/or receiving control and/or data message signals, and in some examples, scheduling or assigning resources (e.g., pilot sequences) for one or more other devices. For example, the communication controller 640 may be configured to implement one or more of the functions described below in relation to FIG. 8, including, e.g., block 801, 802, and/or 810. The processor 604 may further include a signal estimator 642 configured (e.g., in coordination with the memory 605) for various functions, including, e.g., generating a received signal estimate (e.g., a training signal estimate) based on a received signal. In various examples, the signal estimator 642 may be configured to post-multiply a received signal estimate with a vector based on a corresponding pilot sequence, by applying an LMMSE estimator to a received signal, or by any other suitable signal estimation technology. For example, the signal estimator 642 may be configured to implement one or more of the functions described below in relation to FIG. 8, including, e.g., block 804. The processor 604 may further include a channel coefficient estimator 644 configured (e.g., in coordination with the memory 605) for various functions, including, e.g., generating a channel coefficient estimate (e.g., a channel coefficient vector estimate) based on a received signal estimate. In various examples, the channel coefficient estimator 644 may employ a Wavelet decomposition filter or other suitable circuitry to apply a Wavelet transform, based on any suitable mother Wavelet (e.g., a Haar mother Wavelet) to a received signal estimate. In some examples, the Wavelet transform may provide a set of approximation coefficients and a set of detail coefficients. Here, the set of approximation coefficients may correspond to a channel coefficient estimate. For example, the channel coefficient estimator 644 may be configured to implement one or more of the functions described below in relation to FIG. 8, including, e.g., block 806. The processor 604 may further include a channel aging predictor 646 configured (e.g., in coordination with the memory 605) for various functions, including, e.g., generating a prediction of a future channel coefficient (e.g., a predicted channel coefficient vector) based on a channel coefficient estimate. In some examples, the channel aging predictor 646 may be configured according to a first-order autoregressive channel model of aging. For example, the channel aging predictor 646 may be configured to implement one or more of the functions described below in relation to FIG. 8, including, e.g., block 808. The processor 604 may further include a precoding vector/matrix generator 648 configured (e.g., in coordination with the memory 605 and the transceiver 610) for various functions, including, e.g., generating a precoding vector or matrix based on one or more predictions of future channel coefficients. For example, the precoding vector/matrix generator 648 may be configured to implement one or more of the functions described below in relation to FIG. 8, including, e.g., block 810.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may store computer-executable code that includes communication control software 660 that configures a wireless communication entity 600 for various functions, including, e.g., transmitting and/or receiving reference signals (e.g., composite training signals), transmitting and/or receiving control and/or data message signals, and in some examples, scheduling or assigning resources (e.g., pilot sequences) for one or more other devices. For example, the communication control software 660 may be configured to cause a wireless communication entity 600 to implement one or more of the functions described below in relation to FIG. 8, including, e.g., block 801, 802, and/or 810. The computer-executable code may further include signal estimation software 662 that configures a wireless communication entity 600 for various functions, including, e.g., generating a received signal estimate (e.g., a training signal estimate) based on a received signal. In various examples, the signal estimation software 662 may configure a wireless communication entity 600 to post-multiply a received signal estimate with a vector based on a corresponding pilot sequence, by applying an LMMSE estimator to a received signal, or by any other suitable signal estimation technology. For example, the signal estimation software 662 may be configured to implement one or more of the functions described below in relation to FIG. 8, including, e.g., block 804. The computer-executable code may further include a channel coefficient estimation software 664 that configures a wireless communication entity 600 for various functions, including, e.g., generating a channel coefficient estimate (e.g., a channel coefficient vector estimate) based on a received signal estimate. In various examples, the channel coefficient estimation software 664 may configure a wireless communication entity 600 to employ a Wavelet decomposition filter or other suitable circuitry to apply a Wavelet transform, based on any suitable mother Wavelet (e.g., a Haar mother Wavelet) to a received signal estimate. In some examples, the Wavelet transform may provide a set of approximation coefficients and a set of detail coefficients. Here, the set of approximation coefficients may correspond to a channel coefficient estimate. For example, the coefficient estimation software 664 may be configured to implement one or more of the functions described below in relation to FIG. 8, including, e.g., block 806. The computer-executable code may further include a channel aging prediction software 666 that configures a wireless communication entity 600 for various functions, including, e.g., generating a prediction of a future channel coefficient (e.g., a predicted channel coefficient vector) based on a channel coefficient estimate. In some examples, the channel aging prediction software 666 may be configured according to a first-order autoregressive channel model of aging. For example, the channel aging prediction software 666 may be configured to implement one or more of the functions described below in relation to FIG. 8, including, e.g., block 808. The computer-executable code may further include precoding vector/matrix generation software 668 that configures a wireless communication entity 600 for various functions, including, e.g., generating a precoding vector or matrix based on one or more predictions of future channel coefficients. For example, the precoding vector/matrix generation software 668 may be configured to implement one or more of the functions described below in relation to FIG. 8, including, e.g., block 810.

In one configuration, the wireless communication entity 600 includes means for transmitting and/or receiving reference signal (e.g., composite training signals), means for transmitting and/or receiving control and/or data message signals, and in some examples, means for scheduling or assigning resources (e.g., pilot sequences) for one or more other devices. In a further configuration, the wireless communication entity 600 includes means for generating a received signal estimate (e.g., a training signal estimate) based on a received signal. In various examples, the means for generating a received signal estimate may be configured to post-multiply a received signal estimate with a vector based on a corresponding pilot sequence, by applying an LMMSE estimator to a received signal, or by any other suitable signal estimation technology. In a further configuration, the wireless communication entity 600 includes means for generating a channel coefficient estimate (e.g., a channel coefficient vector estimate) based on a received signal estimate. In various examples, the means for generating a channel coefficient estimate may employ a Wavelet decomposition filter or other suitable circuitry to apply a Wavelet transform, based on any suitable mother Wavelet (e.g., a Haar mother Wavelet) to a received signal estimate. In some examples, the Wavelet transform may provide a set of approximation coefficients and a set of detail coefficients.

Here, the set of approximation coefficients may correspond to a channel coefficient estimate. In a further configuration, the wireless communication entity 600 includes means for generating a prediction of a future channel coefficient (e.g., a predicted channel coefficient vector) based on a channel coefficient estimate. In some examples, the means for generating a prediction of a future channel coefficient may be configured according to a first-order autoregressive channel model of aging. In a further configuration, the wireless communication entity 600 includes means for generating a precoding vector or matrix based on one or more predictions of future channel coefficients. In one aspect, the aforementioned means may be the processor(s) 640 shown in FIG. 6 configured to perform the functions recited by the aforementioned means. In another aspect, the aforementioned means may be a circuit or any apparatus configured to perform the functions recited by the aforementioned means.

Figure 8:
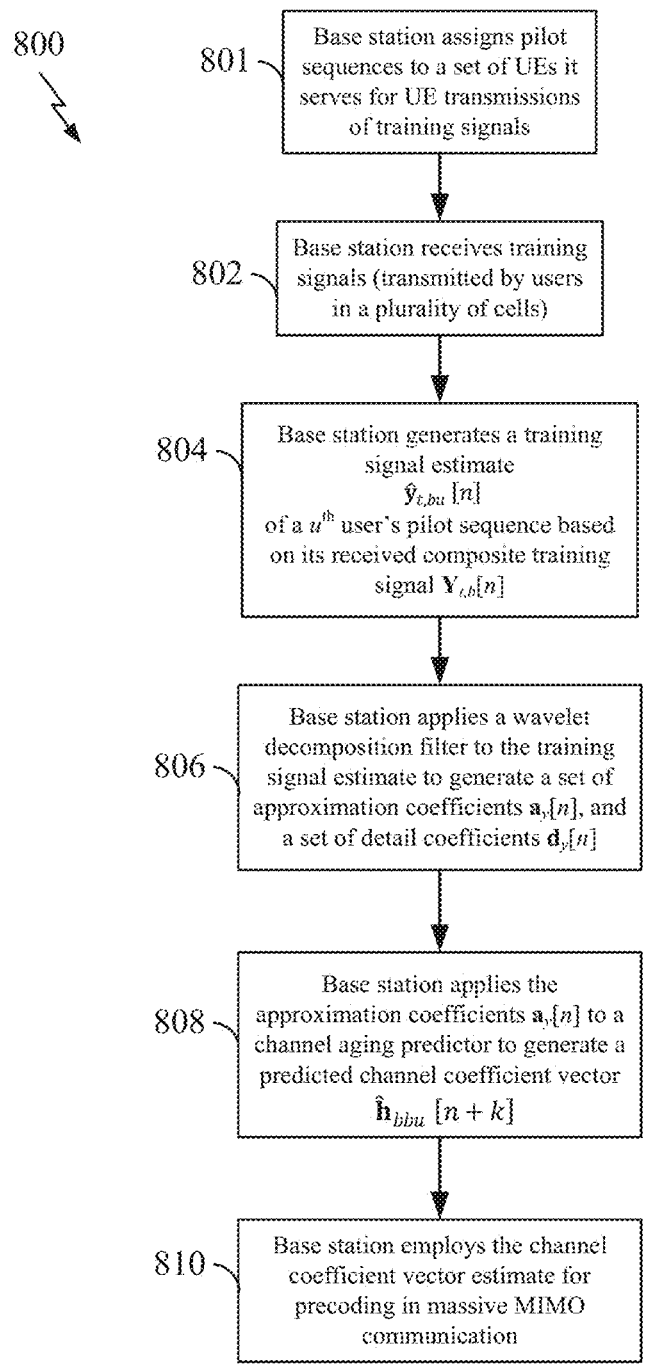
FIG. 8 is a flow chart illustrating an exemplary process for channel estimation corresponding to an aging wireless channel according to some aspects of the disclosure.
Figure 9:
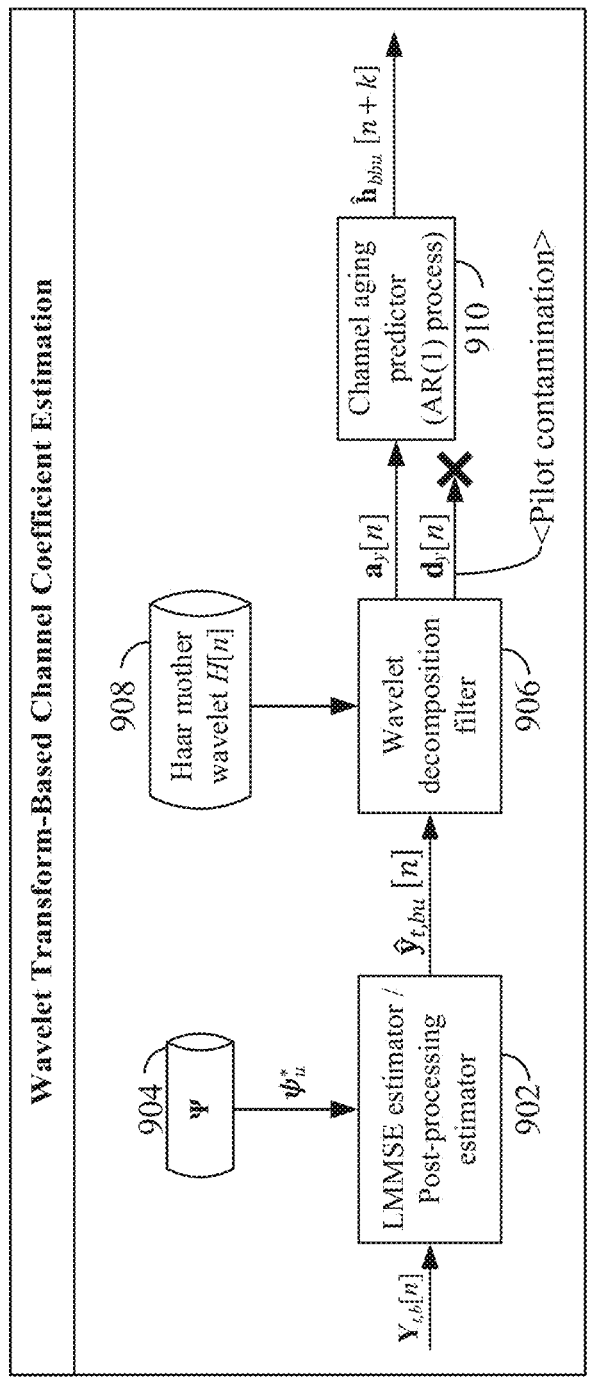
FIG. 9 is a block diagram illustrating an example of a Wavelet transform-based channel estimation according to some aspects of the disclosure.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 4, 5, and/or 7 and utilizing, for example, the processes and/or algorithms described herein in relation to FIGS. 8, 9, and/or 10.

Cellular System Model

The discussion that follows uses the same nomenclature described above. For example, a subscript bcu indicates a channel between base station b, and user u, where user u is located in cell c. As above, $u \in \{0, 1, 2, \ldots, U-1\}$, $b \in \{0, 1, 2, \ldots, C-1\}$, and $c \in \{0, 1, 2, \ldots, C-1\}$. Furthermore, for simplicity, base station b corresponds to (e.g., serves) cell b; base station c corresponds to (e.g., serves) cell c; etc. Thus, $h_{bcu}$ represents the channel experienced by a signal that user u in cell c transmits to base station b (e.g., corresponding to an interfering inter-cell signal). And $h_{bbu}$ represents the channel experienced by a signal that user u in cell b transmits to base station b (e.g., corresponding to a desired intra-cell signal). In the present disclosure, bold letters represent vectors and matrices.

Referring once again to the RAN 500 illustrated in FIG. 5, some aspects of the present disclosure provide for a $b^{th}$ base station 514 to estimate a channel coefficient vector $h_{bbu}$ utilizing a Wavelet-Haar transform.

The set of complex numbers $\mathbb{C}$ is the set of all numbers that can be expressed in the form a+bi, where a and b are real numbers, and $i=\sqrt{-1}$. In the present disclosure, the notation $\mathbb{C}^{-t}$ represents a vector having a set of A elements, where each element in the vector is an element of the set of complex numbers $\mathbb{C}$. And the notation $\mathbb{C}^{A \times B}$ represents a matrix having dimensions A×B, where each element in the matrix is an element of the set of complex numbers $\mathbb{C}$.

It may be assumed that there exists a matrix $H_{bb}[n]$ that represents the combined channel information for the channel between the $b^{th}$ base station 514 (where $b \in \{0, 1, 2, \ldots, C-1\}$) and all U users in the $b^{th}$ cell 502 (where $c \in \{0, 1, 2, \ldots, C-1\}$). In this notation, n represents an $n^{th}$ time instant (e.g., a time instant corresponding to an $n^{th}$ sample). This matrix $H_{bb}[n]$ may be defined as including a set of U channel coefficient vectors, corresponding all U users in the $b^{th}$ cell 502. That is, $H_{bb}[n]:=[h_{bb0}[n], h_{bb1}[n], \ldots, h_{bb(U-1)}[n]] \in \mathbb{C}^{N \times U}$, where $h_{bbu}[n] \in \mathbb{C}^{N}$.

Here, $h_{bbu}$ represents the channel coefficient vector for a transmission between the $u^{th}$ user 506 in the $b^{th}$ cell 502, and the $b^{th}$ base station 514. In the discussion that follows, when a channel coefficient vector $h_{bbu}$ is given in relation to an uplink transmission 550 from the $u^{th}$ user 506 in the $b^{th}$ cell 502 to the $b^{th}$ base station 514 (e.g., an uplink transmission of a reference signal, training signal, or pilot sequence), then assuming channel reciprocity, a complementary channel coefficient vector $h_{bbu}^*$ (i.e., the complex conjugate of the channel coefficient vector $h_{bbu}$) may correspond to a downlink transmission from the $b^{th}$ base station 514 to the $u^{th}$ user 506 in the $b^{th}$ cell 502. For example, such channel reciprocity may often exist when employing a TDD carrier for wireless communication between the $b^{th}$ base station 514 and the $u^{th}$ user 506. Those of ordinary skill in the art will recognize that in an example where channel reciprocity cannot be assumed (e.g., when using an FDD carrier), this relationship between the uplink and downlink channels may not exist. However, extension of the concepts that follow to such a non-reciprocal channel are straightforward and as such, for simplicity, channel reciprocity is assumed in the following discussion.

It may further be assumed that the channel coefficient vector $h_{bbu}[n]$ can be characterized as:

$$h_{bbu}[n] = R_{bbu}^{1/2} v_{bbu}[n]$$

Here, $R_{bbu} \in \mathbb{C}^{N \times N}$ represents a circularly symmetric correlation matrix (e.g., a $\mathbb{C}$ deterministic Hermitian-symmetric positive definite matrix that is independent of the sample index n), where $R_{bbu} = \mathbb{E}[h_{bbu}[n]h_{bbu}^+[n]]$. $\mathbb{E}$ represents the expected value operator. The correlation matrix $R_{bbu}$ may capture many effects, e.g., path loss, shadowing, and spatial correlation in the channel.

A fast fading channel vector $v_{bbu}[n]$ is an N-element vector, where each element represents a CSI of a corresponding one of the N antennas of the $b^{th}$ base station 514. The channel vector $v_{bbu}[n]$ may be considered an uncorrelated wide sense stationary complex Gaussian random process with zero mean and i.i.d. unit variance. That is, $v_{bbu}[n] \sim \mathcal{CN}(0, I_N)$.

Training Stage

In some systems, from time to time, all users within all cells may simultaneously (or substantially simultaneously) transmit a training signal or pilot sequence $\psi_u$, which may be a vector having a number $l_t$ complex elements. Thus, $\psi_u \in \mathbb{C}^{1 \times l_t}$. Here, the subscript t represents the training stage. The parameter $l_t$ represents a number of samples or other suitable time duration units (e.g., symbols) for the pilot sequence $\psi_u$. Each user's training signal $\psi_u$ may have an average uplink transmission power $p_t$ and a time length $l_t$. The various cells in the RAN may be suitably synchronized to provide for this coordinated training stage across cells.

In the discussion that follows, it may be further assumed that all of the C cells in the system may share a set $\Psi$ of U orthonormal pilot sequences $\psi_i$, for $0 \leq i \leq U-1$. That is, the set of pilot sequences $\Psi$ may be defined as $\Psi := [\psi_1, \psi_2, \ldots, \psi_U] \in \mathbb{C}^{U \times l_t}$. Here, orthonormal vectors are configured such that $\Psi \Psi^+ = I_U$ (i.e., an identity matrix with dimensions U×U). Accordingly, $\psi_u \psi_u^* = 1$ for $0 \leq u \leq U-1$.

And still further, it may be assumed that no more than one of the U users in any given cell uses any given pilot sequence $\psi_i$ from the set $\Psi$ in the same training stage. In this way, simultaneous transmissions that use different pilot sequences are orthogonal to one another, and do not substantially contribute interference to (e.g., are substantially uncorrelated to) a desired training signal transmission. And further, in some examples, training signal transmissions that use the desired pilot sequence may be easily estimated by processing a set of received samples by multiplying with the complex conjugate of the desired pilot sequence, as described further below.

During the training stage, the signal received by the $b^{th}$ base station 514 (while all U users in each cell transmit their respective uplink pilot sequences) may be named a composite training signal and denoted as $Y_{t,b}$. The $b^{th}$ base station 514 may store samples $Y_{t,b}[n]$ of the received composite training signal in memory. For example:

$$Y_{t,b}[n] = \sqrt{p_t l_t} \sum_{c=1}^{C} H_{bc}[n]\Psi + Z_{t,b}[n] \qquad (1)$$

Here, $Y_{t,b}[n]$ is a matrix that represents samples of the signal $Y_{t,b}$ that the $b^{th}$ base station 514 receives at each time instant n within the training stage, where the training stage may have a duration of $ST_s$, where S represents the number of samples (i.e., $n \in \{0, 1, \ldots, S-1\}$) and $T_s$ represents the sampling time, or the time interval between successive time instants such as [n−1] and [n]. And by including the sum over the range from c=1 to c=C, the received composite training signal $Y_{t,b}$ includes signals that the $b^{th}$ base station may receive from all U users in all C cells.

The received composite training signal $Y_{t,b}$ generally includes a contribution from noise $Z_{t,b}$ at each of the N antennas of the $b^{th}$ base station. Here, the noise $Z_{t,b} \in \mathbb{C}^{N \times l_t}$ is a matrix that represents complex additive white Gaussian noise (AWGN) experienced by the N antennas at the $b^{th}$ base station 514 during the training stage.

Once the $b^{th}$ base station 514 receives the composite training signal $Y_{t,b}$ and stores samples of the received signal in memory, the $b^{th}$ base station 514 (e.g., employing a processor, DSP, etc.) may generate an estimate $\hat{y}_{t,bu}[n]$ of the component of the composite training signal $Y_{t,b}[n]$, corresponding to the training signal transmission from the $u^{th}$ user 506 in the $b^{th}$ cell 502. In some cases, the $b^{th}$ base station 514 may generate this training signal estimate $\hat{y}_{t,bu}[n]$ by employing an LMMSE estimator, known to those of ordinary skill in the art. And in some cases, by virtue of the use of a set of orthonormal pilot sequences, the $b^{th}$ base station 514 may generate the training signal estimate $\hat{y}_{t,bu}[n]$ by post-multiplying the stored samples of the received composite training signal $Y_{t,b}[n]$ with the complex conjugate of the training signal (e.g., pilot sequence) from the $u^{th}$ user 506 ($\psi_u^*$, which, as the $b^{th}$ base station 514 may provide the pilot sequence to the $u^{th}$ user, the $b^{th}$ base station 514 may know apriori and have stored in memory). That is, $\hat{y}_{t,bu}[n] = Y_{t,b}[n]\psi_u^*$, which can be observed as follows. Equation (2) applies this operation to both sides of the above equation (1).

$$\hat{y}_{t,bu}[n] = Y_{t,b}[n]\psi_u^* = \psi_u^*\left(\sqrt{p_t l_t} \sum_{c=1}^{C} H_{bc}[n]\Psi + Z_{t,b}[n]\right) \qquad (2)$$

Based on the construction of $\Psi$ to include a set of U orthonormal pilot signals, as discussed above, equation (2) can be simplified as follows:

$$\hat{y}_{t,bu}[n] = Y_{t,b}[n]\psi_u^* = h_{bbu}[n] + \sum_{b \neq c} h_{bcu}[n] + \tilde{z}_{t,b}[n] \qquad (3)$$

Applying the complex conjugate of the pilot sequence from the $u^{th}$ user 506 ($\psi_u^*$) in this manner allows the $b^{th}$ base station 514 to pull the contribution from the $u^{th}$ user's pilot transmission out of the sum. That is, $\psi_u^*(\sqrt{p_t l_t} \, h_{bbu} \psi_u) = h_{bbu}$. Additionally, applying the complex conjugate of the pilot sequence in this way cancels out any components of the received composite training signal $Y_{t,b}$ corresponding to transmissions that use different (orthogonal) pilot sequences. That is, $\psi_u^*\sqrt{p_t l_t}\Sigma_{c=1}^C H_{bc} \Psi = h_{bbu} + \Sigma_{b \neq c} h_{bcu}$, where $h_{bcu}$ corresponds to transmissions from users in cells other than the $b^{th}$ cell 502 that employ the same pilot sequence $\psi_u$ as the $u^{th}$ user 506 in the $b^{th}$ cell 502.

As discussed previously, $h_{bbu}$ (see equation (3)) represents a channel coefficient vector for a channel between the $u^{th}$ user 506 in the $b^{th}$ cell 502, and the $b^{th}$ base station 514. Following from equation (3) above, by virtue of the property where $\psi_u \psi_u^*=1$ (see above), it can be seen that $h_{bbu}$ corresponds to the desired signal from the point of view of the $b^{th}$ base station 514.

The term $\Sigma_{b \neq c} h_{bcu}[n]$ in equation (3) represents the contribution of the training signal estimate $\hat{y}_{t,bu}[n]$ that comes from any interfering users in all other cells (i.e., cells other than the $b^{th}$ cell 502) that are using the same pilot sequence Vu during the training stage. That is, this term corresponds to interference from non-orthogonal inter-cell pilot contamination signals.

The above equation (3) further includes a term corresponding to the contribution to the training signal estimate $\hat{y}_{t,bu}[n]$ that comes from any noise that the $b^{th}$ base station 514 receives during the training stage. To simplify the notation in the above equation (3), the vector that represents the noise $\tilde{z}_{t,bu}[n]$ has been defined as:

$$\tilde{z}_{t,bu}[n] = \frac{1}{\sqrt{p_t l_t}} Z_{t,b}[n]\psi_u^* \qquad (4)$$

Thus, a signal to interference and noise ratio (SINR) of the training signal estimate $\hat{y}_{t,bu}[n]$ can easily be gleaned from equation (3) as follows:

$$SINR = \frac{h_{bbu}[n]}{\sum_{b \neq c} h_{bcu}[n] + \tilde{z}_{t,b}[n]} \qquad (4.1)$$

Accordingly, the SINR of the received uplink depends on the values of the channel coefficient vector $h_{bbu}[n]$. Accordingly, accurate estimation of a channel coefficient vector is an important factor in improving or maximizing uplink SINR.

In various aspects, the $b^{th}$ base station 514 may generate a channel coefficient vector estimate $\hat{h}_{bbu}[n]$ based on the training signal estimate $\hat{y}_{t,bu}[n]$. For example, the $b^{th}$ base station 514 may calculate a channel coefficient vector estimate $\hat{h}_{bbu}[n]$ by employing a linear minimum mean square error (LMMSE) estimator, well-known to those of ordinary skill in the art, to the right-hand side of equation (3) above. However, due to the presence of interference and noise, as discussed above, the channel coefficient vector estimate $\hat{h}_{bbu}[n]$ includes estimation error, denoted $\tilde{h}_{bbu}[n]$. That is:

$$h_{bbu}[n] = \hat{h}_{bbu}[n] + \tilde{h}_{bbu}[n] \qquad (5)$$

As discussed above, this approach, which often relies on an LMMSE estimator to generate the channel estimate, can result in significant estimation error $\tilde{h}_{bbu}[n]$. Because a base station employs the channel estimate $\hat{h}_{bbu}[n]$ to generate a precoder for later downlink transmissions, these estimation errors can cause poor performance in terms of downlink throughput. And furthermore, because a base station in massive MIMO employs the channel estimate $\hat{h}_{bbu}[n]$ in decoding uplink transmissions from users in its cell, the same estimation errors can further cause poor performance in terms of uplink throughput.

Modeling Channel Aging

While the above discussion has concentrated on estimation error $\hat{h}_{bbu}[n]$ corresponding to pilot contamination, the estimated channel coefficient vector $h_{bbu}[n]$ may further suffer from estimation error corresponding to channel aging. That is, at the time instant when a base station applies an estimated channel coefficient vector $h_{bbu}[n]$, e.g., for precoding a downlink transmission, time instant n has passed. Changes in the channel since time instant n (e.g., caused by movement of a user's antennas, movement of reflecting objects between the transmission endpoints, or any other reason) can result in estimation error.

According to an aspect of this disclosure, it may be assumed that channel aging generally follows a first-order autoregressive model, which may be denoted as an AR(1) process. With this model, temporal variation of the channel coefficient vector $h_{bbu}$ at a sample taken at time instant [n] depends on the previous sample [n−1], but does not depend on other samples taken prior to the previous sample [n−1]. Thus, the channel coefficient vector $h_{bbu}$ may be given as follows when taking channel aging into account.

$$h_{bbu}[n] = \alpha h_{bbu}[n-1] + a_{bbu}[n] + \tilde{w}[n] \quad (6)$$

In equation (6), α represents an autocorrelation coefficient (e.g., degeneration coefficient) for the channel coefficient vector $h_{bbu}$. The parameter w represents noise. In equation (6), $\tilde{w}[n]$ represents a model of the noise as a Gaussian random variable (e.g., white Gaussian noise).

The vector $a_{bbu}$ represents an aging factor that may be caused by impairments other than velocity of the user. For example, the aging factor $a_{bbu}$ may correspond to a frequency mismatch, where a phase-locked loop (PLL) at the $u^{th}$ user's mobile equipment fails to bring about a frequency that exactly matches that of its serving base station. Those of ordinary skill in the art will recognize that channel aging due to a frequency mismatch is just one example, and $a_{bbu}$ may correspond to an aging factor based on any reason other than velocity of the user. In the present discussion, it is assumed that $a_{bbu}$ can be represented by a Gaussian random variable. And in some examples within the scope of the present disclosure, $a_{bbu}$ may be omitted or given a value of 0.

In an AR(1) process, the autocorrelation coefficient α for the channel coefficient vector $h_{bbu}$ may be denoted as:

$$\alpha[k] = J_0(2\pi f_D T_s |k|) \quad (7)$$

for k lags. Here, $J_0$ represents a zeroth-order Bessel function of the first kind, and $f_D$ represents a Doppler shift in frequency (e.g., Doppler spread) resulting from user movement. $T_s$ represents the sampling time, or the time interval between successive time instants such as [n−1] and [n]. k can represent any suitable time interval. In some examples, k may represent a lag or delay given in a number of samples or symbols.

The Doppler shift $f_D$ may be given by $$f_D = \frac{|\vec{v}|}{\lambda} \cos(\theta).$$

Figure 7:
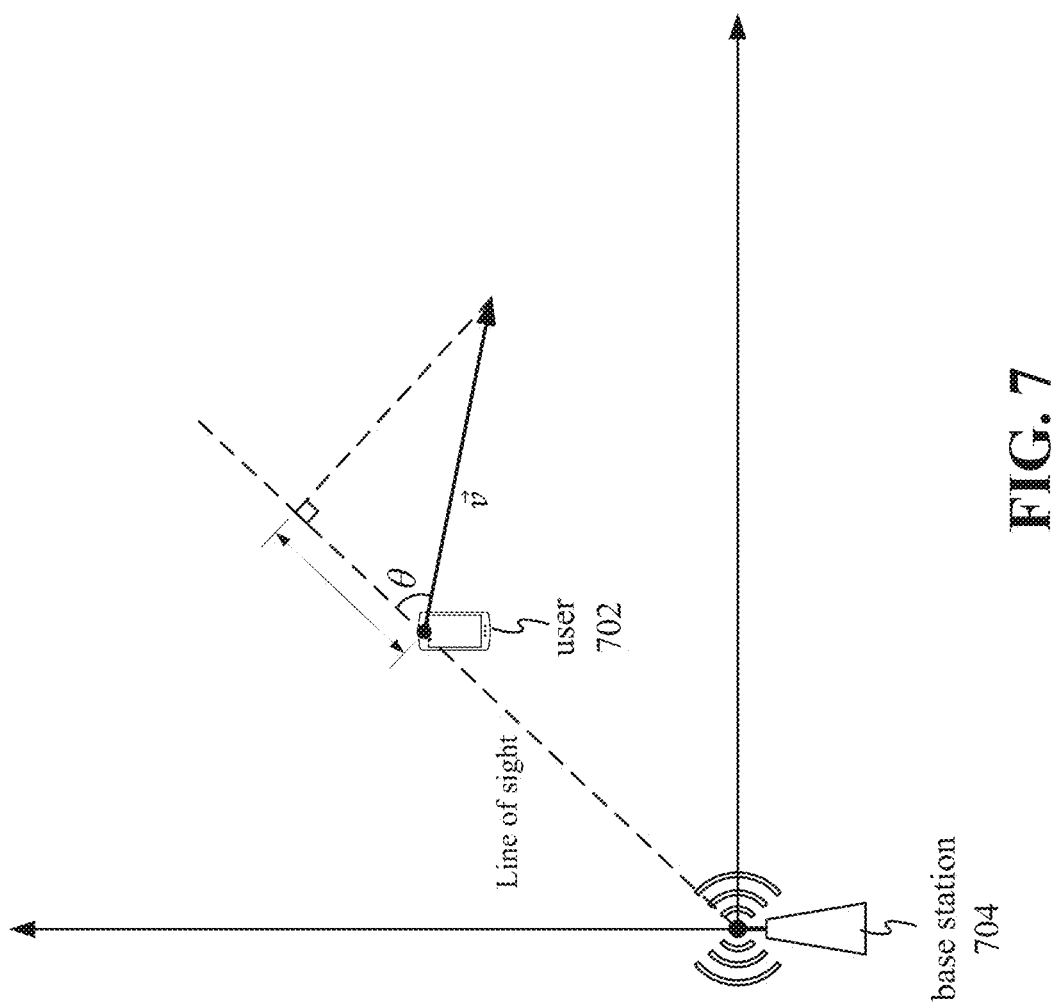
FIG. 7 is a chart schematically illustrating certain parameters of a Doppler shift in wireless transmissions according to some aspects.

Here, the wavelength used for a transmission over the channel between a station 804 and a user 802 may be denoted as λ. To illustrate the Doppler shift, FIG. 7 is a diagram illustrating a base station 704 serving a user 702. As illustrated, the user 702 is moving with a velocity $\vec{v}$. Here, $\vec{v}$ points in a direction at an angle θ relative to a line of sight between the user 702 and the base station 704 antenna, and has a length that represents the user's speed. In the illustrated example, the projection of the user's velocity $\vec{v}$ in the direction of the line of sight between the user 802 and the base station 804 antenna may be given by $|\vec{v}| \cos \theta$.

As seen from the equations (6) and (7) above, the autocorrelation coefficient $\alpha = J_0(2\pi f_D T_s |k|)$, and thus, the magnitude of the channel aging (e.g., the 'flatness' of the channel) depends, in part, on the user's velocity $\vec{v}$ and angle θ. For example, an increase in the user's velocity may increase the Doppler shift $f_D$, causing a decrease in the autocorrelation coefficient α. This decreasing autocorrelation coefficient α corresponds to a more rapid degeneration of the channel coefficient vector $h_{bbu}$. In other words, if the sampling rate remains the same, the channel generally ages faster as a user's velocity increases.

As discussed further below, by employing this model of channel aging as an AR(1) process as shown in equation (6), a wireless communication device (e.g., a base station) may predict future channel coefficients based on current channel coefficient measurements. That is, if the channel aging model closely tracks the actual time evolution of the channel coefficients, and if an initial channel coefficient estimate $\hat{h}_{bbu}[n]$ is accurate to the actual channel at the time of measurement, then the device may generate a useful future or predicted channel coefficient vector estimate $\hat{h}_{bbu}[n+t]$ for any suitable value of t. Moreover, the computational resources required to track a channel with this AR(1) model are minimal, reducing time and energy used to predict the aged channel.

Downlink Transmission

Referring once again to FIG. 5, the discussion that follows refers to a downlink transmission from the $b^{th}$ base station 514 to all users (e.g., users in any cell). To characterize the downlink channel, sometimes also referred to as the forward link, it may be assumed that the $b^{th}$ base station 514 transmits a set of data symbols, or a message signal $m_{f,bu}$ to the $u^{th}$ user 506. The subscript f represents the forward link (e.g., the downlink).

When a downlink transmission to the $u^{th}$ user 506 is part of a massive MIMO transmission, the $b^{th}$ base station 514 may apply a suitable precoding vector $f_{bu}$ to the message signal $m_{f,bu}$, where $f_{bu} \in \mathbb{C}^N$. This precoding vector may be a considered as a component (e.g., a column) of a precoding matrix $F_b \in \mathbb{C}^{N \times U}$, which represents the precoding matrix the $b^{th}$ base station 514 applies across its set of N antennas for a multiplexed transmission to all U users in the $b^{th}$ cell 502.

Thus, a signal that the $b^{th}$ base station 514 transmits to the $u^{th}$ user 506 may be represented as $\sqrt{\lambda_b} f_{bu} m_{f,bu}$. Here, $\lambda_b$ is a normalization parameter, included to ensure the transmission meets an average transmit power constraint. In general, for any given base station j, the normalization parameter may be represented by the following:

$$\lambda_j = \frac{1}{\mathbb{E}\left[F_j[n] F_j^*[n]\right]}$$

When the $b^{th}$ base station 514 transmits the downlink signal $\sqrt{\lambda_b}f_{bu}m_{f,bu}$, a user (e.g., the $u^{th}$ user 506 in the $b^{th}$ cell 502) may receive a signal that may be denoted as $y_{f,bu}$. However, base stations in other cells in the RAN 500 may simultaneously transmit their own data. Thus, the received signal $y_{f,bu}$ may include not only the transmission from the $b^{th}$ base station 514, but may also include noise $z_{f,bu}$, as well as interference from transmissions made by other base stations in addition to the $b^{th}$ base station (e.g., the $c^{th}$ base station 516). If it is assumed that all C base stations in the system employ the same average downlink transmission power $p_f$ for their respective downlink transmissions, then the signal that the $u^{th}$ user 506 in the $b^{th}$ cell 502 receives, samples, and stores in memory may be given as:

$$y_{f,bu}[n] = \sqrt{p_f}\sqrt{\lambda_b}h^*_{bbu}[n]f_{bu}[n]m_{f,bu}[n] + \quad (8)$$
$$z_{f,bu}[n] + \sum_{c \neq b}\sqrt{p_f}\sqrt{\lambda_c}h^*_{cbu}[n]f_{cu}[n]m_{f,cu}[n]$$

Equation (8) describes three components of a signal received by the $u^{th}$ user 506. First, the desired signal from the $b^{th}$ base station 514 corresponds to a first part: $\sqrt{p_f}\sqrt{\lambda_b}h_{bbu}^*[n]f_{bu}[n]m_{f,bu}[n]$. Second, noise received by the $u^{th}$ user 506 corresponds to a second part: $z_{f,bu}[n]$. And third, inter-cell interference from base stations other than the $b^{th}$ base station (e.g., the $c^{th}$ base station 516) corresponds to a third part: $\Sigma_{c \neq b}\sqrt{p_f}\sqrt{\lambda_c}h_{cbu}^*[n]f_{cu}[n]m_{f,cu}[n]$.

Thus, as seen in equation (8), the precoding vector $f_{bu}$ utilized by the $b^{th}$ base station 514 directly affects the component of a user's received signal $y_{f,bu}[n]$ that corresponds to the desired signal from the $b^{th}$ base station 514. For example, based on equation (8), the signal to interference and noise ratio (SINR) seen by the $u^{th}$ user 506 can be represented as follows:

$$SINR = \frac{\sqrt{p_f}\sqrt{\lambda_b}h^*_{bbu}[n]f_{bu}[n]m_{f,pu}[n]}{z_{f,pu}[n] + \sum_{c \neq b}\sqrt{p_f}\sqrt{\lambda_c}h^*_{cbu}[n]f_{cu}[n]m_{f,cu}[n]} \quad (8.1)$$

In some examples, a base station such as the $b^{th}$ base station 514 may configure a precoding vector $f_{bu}$ for communication with the $u^{th}$ user 506 based on equation (8.1) with an aim to reduce or minimize the effects of the wireless channel, noise, and interference (e.g., to improve or maximize the SINR). That is, equation (8.1) shows that the configuration of the precoding vector $f_{bu}$ impacts the SINR of the desired signal received by the $u^{th}$ user 506. However, equation (8.1) also shows that the SINR depends on the accuracy of the base station's estimate of the channel coefficient vector $h_{bbu}^*$ for the downlink transmission to the $u^{th}$ user 506. That is, the capability of a base station to generate a suitable precoding vector to improve the SINR may be inhibited if the base station does not have an accurate channel estimate. Thus, if a base station generates a poor estimate of the channel coefficient vector $h_{bbu}^*$, e.g., from pilot contamination, from channel aging, or from a combination of these, this can result in a poor SINR. Therefore, to improve SINR in a massive MIMO network, there is a need in the art for an improved channel coefficient vector estimate.

Generating a Channel Estimate Using a Wavelet-Haar Method

As discussed above in relation to the training stage, a base station (e.g., the $b^{th}$ base station 514) may employ any suitable procedure in an effort to generate an accurate estimate $\hat{h}_{bbu}[n]$ of a channel coefficient vector $h_{bbu}[n]$. However, with previous approaches, such as generating the estimate $\hat{h}_{bbu}[n]$ by employing an LMMSE estimator, as seen in equation (5) the channel estimate may include a significant estimation error $\tilde{h}_{bbu}[n]$. In turn, this poor channel estimate may result in poor precoding performance (e.g., a poor SINR).

According to an aspect of the present disclosure, a base station may generate a channel coefficient vector estimate $\hat{h}_{bbu}[n]$ by employing a Wavelet decomposition filter with a suitable mother wavelet, as described below. In a particular example, the base station may employ a Wavelet-Haar transform, using a Haar mother Wavelet. In this manner, a more accurate channel estimate (e.g., providing a low root mean squared error (RMSE) compared to the true channel coefficient vector $h_{bbu}[n]$) can be obtained, even when confronted with pilot contamination and/or channel aging. Those of ordinary skill in the art will recognize that any other suitable mother Wavelet (e.g., a Daubechies mother Wavelet) may be substituted for the exemplary Haar mother Wavelet.

FIG. 8 is a flow chart illustrating an exemplary process 800 for generating a channel estimate in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the wireless communication entity 600 illustrated in FIG. 6. In some examples, the process 800 may be carried out by any suitable apparatus or means for carrying out the functions or algorithm described below.

In the discussion of the process 800 that follows, additional reference is made to a block diagram provided in FIG. 9, showing an example of an apparatus or functional block configured for Wavelet transform-based channel coefficient estimation. As described above, in various examples, the Wavelet transform-based channel coefficient estimator illustrated in FIG. 9 may be included in, and/or coupled to, the wireless communication entity 600 illustrated in FIG. 6 (e.g., corresponding to one or more of the processor 604, the computer-readable medium 606, and/or the memory 605).

In the exemplary process 800, a wireless communication entity (e.g., for consistency with the above description, a $b^{th}$ base station that serves a set of U UEs in a $b^{th}$ cell) may employ a training stage for generation of a channel estimate. For example, at block 801, the $b^{th}$ base station may assign training signals to a plurality of UEs (e.g., a set of U UEs). In some examples, the $b^{th}$ base station may retrieve a set of U orthonormal pilot sequences Ψ (e.g., where Ψ=[ψ$_1$, ψ$_2$, . . . , ψ$_U$]) from memory 904, and may assign pilot sequences ψ$_u$ from the set Ψ to respective ones of the U UEs. In some examples, the memory 904 may correspond to the memory 605 described above and illustrated in FIG. 6, in connection with the wireless communication entity 600. Here, assigning pilot sequences may correspond to transmitting, via a transceiver, a suitable control message to each of the UEs.

At block 802, the base station (e.g., the $b^{th}$ base station) may receive (e.g., utilizing a transceiver) a composite training signal corresponding to a set of uplink training signals or pilot sequences that are simultaneously or substantially simultaneously transmitted by a plurality of UEs. Here, the base station may generate and store samples $Y_{t,b}[n]$ of the received composite training signal $Y_{t,b}$ (see equation (1)) in memory. Here, $n \in \{1, 2, \ldots, S\}$, with S representing the number of samples. Once again, although the base station may configure the set of UEs it serves to utilize orthonormal pilot sequences, the composite training signal $Y_{t,b}$ that the base station receives may still be affected by pilot contamination due to one or more non-orthogonal pilot sequences simultaneously or substantially simultaneously transmitted by UEs in other (e.g., neighboring) cells.

At block 804, the base station may generate a training signal estimate, estimating a training signal or pilot sequence transmitted by a selected UE that the base station serves. For example, the $b^{th}$ base station may generate a training signal estimate $\hat{y}_{t,bu}[n]$ corresponding to a $u^{th}$ UE in the $b^{th}$ cell. Referring to FIG. 9, in some examples, a training signal estimator 902 may generate a training signal estimate $\hat{y}_{t,bu}[n]$ based on the stored composite training signal $Y_{t,b}[n]$ and, optionally, the set of pilot sequences TP stored in memory 904. For example, in some aspects the training signal estimator 902 may employ suitable signal processing including but not limited to utilizing an LMMSE estimator to generate the training signal estimate $\hat{y}_{t,bu}[n]$ based on the stored samples of the received composite training signal $Y_{t,b}[n]$. In some examples, the training signal estimator 902 may generate the training signal estimate $\hat{y}_{t,bu}[n]$ by retrieving from its memory 904 the pilot sequence $\psi_u$ assigned to the $u^{th}$ UE for its pilot transmission, and post-multiplying the stored samples of the received composite training signal $Y_{t,b}[n]$ with the complex conjugate of the $u^{th}$ UE's user training signal (e.g., pilot sequence) $\psi_u^*$ (see equation (3), corresponding to equation (9) below).

$$\hat{y}_{t,bu}[n] = h_{bbu}[n] + \sum_{b \neq c} h_{bcu}[n] + z_{t,b}[n] \quad (9)$$

At block 806, the base station may pass the training signal estimate $\hat{y}_{t,bu}[n]$ through a Wavelet decomposition filter 906 configured with a suitable mother Wavelet. In some examples, the Wavelet decomposition filter may be configured with a Haar mother Wavelet, generally characterized in equation (10). This configuration is referenced herein as a Haar transform.

$$H(t) = \begin{cases} 1, & 0 < t < 1/2 \\ -1, & 1/2 < t < 1 \\ 0, & \text{otherwise} \end{cases} \quad (10)$$

The Haar transform is a Wavelet transform employed in a variety of different fields, such as pattern recognition, image processing and compression, etc. However, performing this operation to generate a channel coefficient vector estimate as described herein can provide for improved performance as well as reduced computational requirements.

In an aspect of the present disclosure, the Wavelet decomposition filter 906 may apply a discrete Wavelet transform to the signal estimate $\hat{y}_{t,bu}[n]$. Here, a discrete Wavelet transform of the signal estimate $\hat{y}_{t,bu}u$ may be calculated based on a mother Wavelet H corresponding to a Haar matrix, by calculating $H\hat{y}_{t,bu}[n]$. For example, a 2×2 Haar matrix $H_2$ is provided below, although those of ordinary skill in the art will recognize that any suitable dimension of a Haar matrix $H_N$ may be utilized within the scope of this disclosure. That is, a Haar matrix of any given dimension $H_N$ may be generated according to a well-known algorithm that need not be provided herein.

$$H_2 = \frac{1}{\sqrt{2}} \begin{bmatrix} 1 & 1 \\ 1 & -1 \end{bmatrix}$$

As an example, the Wavelet decomposition filter 906 may transform the sequence $\hat{y}_{t,bu}[n] = \{\hat{y}_{t,bu}[1], \hat{y}_{t,bu}[2], \ldots \hat{y}_{t,bu}[S-1], \hat{y}_{t,bu}[S]\}$ into a sequence of two-component vectors $\{(\hat{y}_{t,bu}[1], \hat{y}_{t,bu}[2]), \ldots, (\hat{y}_{t,bu}[S-1], \hat{y}_{t,bu}[S])\}$, and multiply each of these vectors with the Haar matrix $H_2$. This calculation results in an output sequence $$\left\{ (a_y[1], d_y[1]), (a_y[2], d_y[2]), \ldots, \left(a_y\left[\frac{S}{2}-1\right], d_y\left[\frac{S}{2}-1\right]\right), \left(a_y\left[\frac{S}{2}\right], d_y\left[\frac{S}{2}\right]\right) \right\}.$$

The Wavelet decomposition filter 906 may accordingly generate output parameters, including a set of approximation coefficients $a_y[n]$ and a set of detail coefficients $d_y[n]$. In an example that employs the Haar mother Wavelet, the Wavelet decomposition filter 906 may generate a set of approximation coefficients $a_y[n]$ as follows:

$$a_y[n] = \frac{\hat{y}_{t,bu}[2n-1] + \hat{y}_{t,bu}[2n]}{\sqrt{2}}, \quad n = 1, 2, \ldots, s/2 \quad (11)$$

And the Wavelet decomposition filter 906 may generate a set of detail coefficients $d_y[n]$ as follows:

$$d_y[n] = \frac{\hat{y}_{t,bu}[2n-1] - \hat{y}_{t,bu}[2n]}{\sqrt{2}}, \quad n = 1, 2, \ldots, s/2 \quad (12)$$

Once again, S corresponds to the number of samples from the training stage operation. According to an aspect of the present disclosure, employing a Haar transform in this manner enables a computing device to obtain a more accurate channel coefficient vector estimate $\hat{h}_{bbu}[n]$ by reducing or minimizing the non-stationarity of the training signal estimate $\hat{y}_{t,bu}[n]$. That is, based on these approximation coefficients and detail coefficients, a computing device such as a base station may generate an estimate of the channel coefficient vector $h_{bbu}[n]$ while substantially removing contributions to this estimate made from interference such as pilot contamination. For example, the approximation coefficients $a_y[n]$ generally correspond to an output of a low-pass filter applied to the training signal estimate $\hat{y}_{t,bu}[n]$, and may be considered as the desired channel coefficient estimate. The detail coefficients $d_y[n]$ generally correspond to an output of a high-pass filter applied to the training signal estimate $\hat{y}_{t,bu}[n]$, and may be considered as interference (e.g., pilot contamination) and discarded.

Thus, at block 808, the base station may apply the approximation coefficients $a_y[n]$ to a channel aging predictor 910 to generate a prediction of a future channel coefficient vector $\hat{h}_{bbu}[n+k]$. In some examples, the base station may discard the detail coefficients $d_y[n]$. According to an aspect of this disclosure, as described above (see equation (6)), the channel aging predictor 910 may be configured to employ a channel prediction algorithm, e.g., for predicting channel aging according to an AR(1) process as follows. The AR(1) process models channel aging of a channel coefficient vector $h_{bbu}$ as depending on an autocorrelation coefficient $\alpha$ and the value of the channel coefficient vector in the previous sample.

$$h_{bbu}[n] = \alpha h_{bbu}[n-1] + a_{bbu}[n] + \tilde{w}[n] \quad (13)$$

As discussed above in relation to equation (7) and the discussion that follows, the autocorrelation coefficient $\alpha$ is a function of the relevant UE's velocity $\vec{v}$ (e.g., its speed and angle $\theta$ relative to a line-of-site direction between the UE and the base station at a given time). In some examples, a base station may optionally obtain information that indicates values for a UE's speed and direction using any of a variety of suitable mechanisms. For example, the UE may monitor these parameters and report them to the base station along with (or otherwise in association with) its training signal transmission. In some examples, a base station may determine a UE's direction based on an angle of arrival estimation of the UE's training signal.

Accordingly, based on the relevant UE's speed and direction, and the channel coefficient vector estimate $\hat{h}_{bbu}[n]$ (corresponding to the approximation coefficients $a_y[n]$), a channel aging predictor 910 may calculate a prediction of a channel coefficient vector at a future time. For example, based on a channel coefficient vector estimate $\hat{h}_{bbu}[n]$, a channel aging predictor 910 can employ equation (13) to generate a prediction of a channel coefficient vector at time [n+1] as follows:

$$h_{bbu}[n+1] = \alpha \hat{h}_{bbu}[n] + a_{bbu}[n+1] + \tilde{w}[n+1] \quad (14)$$

In some examples, the parameters $a_{bbu}$ and $\tilde{w}$ may be assumed to be time-invariant, taking the same values for all values of n. In other examples, any suitable model for time variation in the noise model $\tilde{w}$ and the aging factor $a_{bbu}$ may be utilized within the scope of the present disclosure. And in some examples, an estimate of the autocorrelation coefficient $\alpha$ may be calculated by assuming the parameters $a_{bbu}$ and $\tilde{w}$, as random processes, have average values of zero, such that, on the average across all values of n, $\hat{h}_{bbu}[n+1] \approx \alpha \hat{h}_{bbu}[n]$. Accordingly, a channel aging predictor 901 may generate a simple estimate of the autocorrelation coefficient $\alpha$ based on an average value of $\alpha$ across the values in the sequence $$\hat{h}_{bbu}[n], \text{ e.g., } \alpha \approx \frac{1}{S} \sum_{n=1}^{S-1} \frac{\hat{h}_{bbu}[n+1]}{\hat{h}_{bbu}[n]}.$$

By iterating equation 14 any suitable number of times k, a channel aging predictor 910 may generate a prediction of a channel coefficient vector at any desired time in the future (relative to the time instant n corresponding to the time the base station received the training signal) $\hat{h}_{bbu}[n+k]$. In this example, if the sampling time, or time between successive samples is $[n+1]-[n]=T_s$, then the time delay or duration into the future (relative to time instant n) of the channel prediction corresponds to $kT_s$.

At block 810, the base station may accordingly employ the channel coefficient estimate $h_{bbu}[n]$ (or $h_{bbu}[n+k]$ corresponding to an instant at a time $kT_s$ later than the time instant of the received and sampled training signal) for communication with the selected user (e.g., the $u^{th}$ UE). For example, the base station may calculate and utilize a pre-coding vector for a downlink transmission to the $u^{th}$ UE at time [n+k] based on the prediction of the future channel coefficient vector.

By generating a channel coefficient vector estimate utilizing the above described process, a base station may achieve an improved ability to track an aging channel, even at high velocity (e.g., with a high $f_D T_s$). Thus, the base station may obtain an increased average sum throughput rate (e.g., the combined throughput of all users in a given cell) for both downlink and uplink transmissions, across a full range of user velocities.

Figure 10:
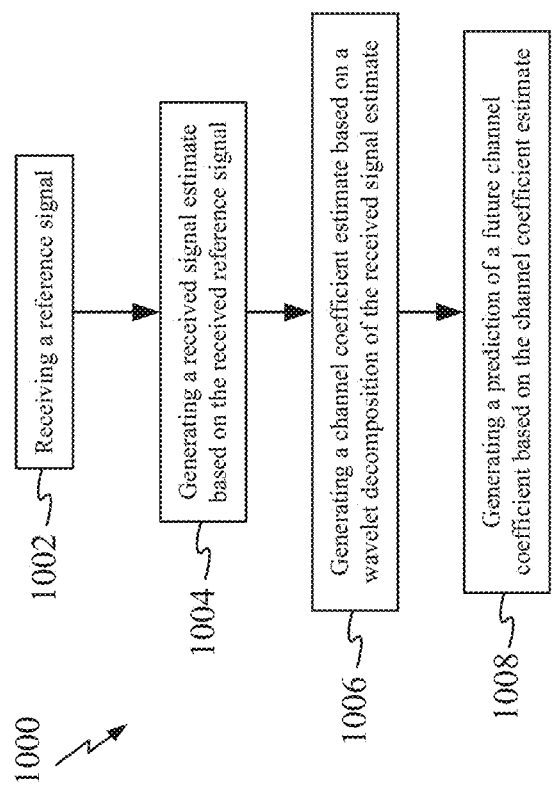
FIG. 10 is a flow chart illustrating another exemplary process for channel estimation corresponding to an aging wireless channel according to some aspects of the disclosure.

FIG. 10 is a flow chart illustrating an exemplary process 1000 for generating a channel estimate in accordance with further aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication entity 600 illustrated in FIG. 6. In some examples, the process 1000 may be carried out by any suitable apparatus or means for carrying out the functions or algorithm described below.

A wireless communication entity receives a reference signal 1002, e.g., utilizing a wireless transceiver. Such reference signal may be any signal suitable for channel characterization of a wireless channel, e.g., relating to channel correlation statistics, path loss matrices, or other parameters of a given channel. The wireless communication entity may take a sequence of samples of the reference signal and store the samples in memory.

Based on the received reference signal, the wireless communication entity generates a received signal estimate 1004. For example, the wireless communication entity may process the stored samples of the reference signal to remove or suppress unwanted contributions to the signal, such as interference.

The wireless communication entity then generates a channel coefficient estimate based on a Wavelet decomposition of the received signal estimate 1006. For example, the wireless communication entity may apply a Wavelet decomposition filter or other suitable circuitry to apply a Wavelet transform to the received signal estimate, based on any suitable mother Wavelet. Here, at least a portion of an output generated by the Wavelet decomposition filter may correspond to the channel coefficient estimate.

The wireless communication entity further generates a prediction of a future channel coefficient based on the channel coefficient estimate 1008. For example, the wireless communication entity may employ a suitable model of changes to the channel coefficient over time. With this model, the wireless communication entity may observe a change of the channel coefficient estimate over time, and extrapolate the observed pattern to determine a prediction of the future channel coefficient.

By employing a channel estimation as described above, with a Wavelet decomposition of a received signal estimate and a future channel coefficient prediction, a wireless communication device can achieve an improved accuracy of a channel state estimate, e.g., addressing issues of pilot contamination and channel aging with a single solution. And furthermore, such channel estimation can achieve improved tracking of an aging channel for multiple users across wide Doppler spreads.

Further Examples Having a Variety of Features

Example 1: A method, apparatus, and non-transitory computer-readable medium for channel estimation. A wireless communication entity receives a reference signal and generates a received signal estimate based on the received reference signal. The wireless communication entity then generates a channel coefficient estimate based on a wavelet decomposition of the received signal estimate. The wireless communication entity further generates a first prediction of a future channel coefficient based on the channel coefficient estimate.

Example 2: A method, apparatus, and non-transitory computer-readable medium of Example 1, where the wireless communication entity generates the channel coefficient estimate utilizing a Haar mother wavelet for the wavelet decomposition, calculating a set of approximation coefficients and a set of detail coefficients. Here, the generated channel coefficient estimate corresponds to the set of approximation coefficients.

Example 3: A method, apparatus, and non-transitory computer-readable medium of any of Examples 1 to 2, where the wireless communication entity generates the first prediction of the future channel coefficient according to a first-order autoregressive model of channel aging.

Example 4: A method, apparatus, and non-transitory computer-readable medium of any of Examples 1 to 3, where the received reference signal is a composite training signal corresponding to training signals transmitted by each one of multiple transmitting devices. The wireless communication entity generates the received signal estimate by generating a training signal estimate corresponding to a first training signal transmitted by a first transmitting device, among the multiple transmitting devices. And the channel coefficient estimate corresponds to a channel between the first transmitting device and the wireless communication entity.

Example 5: A method, apparatus, and non-transitory computer-readable medium of any of Examples 1 to 4, where the wireless communication entity further assigns a first pilot sequence to the first transmitting device for its transmission of the first training signal. Thus, the wireless communication entity generates the received signal estimate either by post-multiplying the received signal estimate with a vector based on the first pilot sequence, or by applying a linear minimum mean square error (LMMSE) estimator to the received signal estimate.

Example 6: A method, apparatus, and non-transitory computer-readable medium of any of Examples 1 to 5, where the wireless communication entity generates multiple channel coefficient estimates corresponding to respective ones of the multiple transmitting devices. Thus, the first channel coefficient estimate is one among the multiple channel coefficient estimates.

Example 7: A method, apparatus, and non-transitory computer-readable medium of any of Examples 1 to 6, where the wireless communication entity generates the first prediction of the future channel coefficient by generating multiple predictions of future channel coefficients based on respective ones of the multiple channel coefficient estimates. Thus, the first prediction of the future channel coefficient is one among the multiple predictions of future channel coefficients.

Example 8: A method, apparatus, and non-transitory computer-readable medium of any of Examples 1 to 7, where the wireless communication entity generates a precoding matrix based on the multiple predictions of the future channel coefficients. The wireless communication entity then transmits a signal that includes a multiplexed set of messages to the multiple transmitting devices, the signal configured according to the generated precoding matrix.

Example 9: A method, apparatus, and non-transitory computer-readable medium of any of Examples 1 to 8, where the wireless communication entity generates a precoding vector based on the first prediction of the future channel coefficient and transmits a message configured according to the generated precoding vector.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of channel estimation operable at a wireless communication entity, the method comprising:
   receiving a reference signal;
   generating a received signal estimate based on the received reference signal;
   generating a channel coefficient estimate based on a wavelet decomposition of the received signal estimate by calculating a set of approximation coefficients and a set of detail coefficients, the generated channel coefficient estimate corresponding to the set of approximation coefficients; and
   generating a first prediction of a future channel coefficient based on the channel coefficient estimate.

2. The method of claim 1, wherein the generating the channel coefficient estimate comprises utilizing a Haar mother wavelet for the wavelet decomposition.

3. The method of claim 1, wherein the generating the first prediction of the future channel coefficient corresponds to a first-order autoregressive model of channel aging.

4. The method of claim 1,
   wherein the received reference signal comprises a composite training signal corresponding to training signals transmitted by each one of a plurality of transmitting devices;
   wherein the generating the received signal estimate comprises generating a training signal estimate corresponding to a first training signal transmitted by a first transmitting device of the plurality of transmitting devices; and
   wherein the channel coefficient estimate corresponds to a channel between the first transmitting device and the wireless communication entity.

5. The method of claim 4, further comprising:
   assigning a first pilot sequence to the first transmitting device for its transmission of the first training signal;
   wherein the generating the received signal estimate comprises at least one of:
      post-multiplying the received signal estimate with a vector based on the first pilot sequence; or
      applying a linear minimum mean square error (LMMSE) estimator to the received signal estimate.

6. The method of claim 4, further comprising:
   generating a plurality of channel coefficient estimates corresponding to respective ones of the plurality of transmitting devices, the first channel coefficient estimate being among the plurality of channel coefficient estimates.

7. The method of claim 6,
   wherein the generating the first prediction of the future channel coefficient comprises generating a plurality of predictions of future channel coefficients based on respective ones of the plurality of channel coefficient estimates, the first prediction of the future channel coefficient being among the plurality of predictions of future channel coefficients.

8. The method of claim 1, further comprising:
   generating a precoding vector based on the first prediction of the future channel coefficient; and
   transmitting a message configured according to the generated precoding vector.

9. A method of channel estimation operable at a wireless communication entity, the method comprising:
   receiving a reference signal;
   generating a received signal estimate based on the received reference signal;
   generating a plurality of channel coefficient estimates based on a wavelet decomposition of the received signal estimate;
   generating a plurality of predictions of future channel coefficients based on respective ones of the plurality of channel coefficient estimates;
   generating a precoding matrix based on the plurality of predictions of the future channel coefficients; and
   transmitting a signal comprising a multiplexed set of messages to the plurality of transmitting devices, the signal configured according to the generated precoding matrix.

10. A wireless communication entity configured for channel estimation, the wireless communication entity comprising:
    means for receiving a reference signal;
    means for generating a received signal estimate based on the received reference signal;
    means for generating a channel coefficient estimate based on a wavelet decomposition of the received signal estimate by calculating a set of approximation coefficients and a set of detail coefficients, the generated channel coefficient estimate corresponding to the set of approximation coefficients; and
    means for generating a first prediction of a future channel coefficient based on the channel coefficient estimate.

11. The wireless communication entity of claim 10, wherein the means for generating the channel coefficient estimate is configured to utilize a Haar mother wavelet for the wavelet decomposition.

12. The wireless communication entity of claim 10, wherein the means for generating the first prediction of the future channel coefficient is configured according to a first-order autoregressive model of channel aging.

13. The wireless communication entity of claim 10,
wherein the received reference signal comprises a composite training signal corresponding to training signals transmitted by each one of a plurality of transmitting devices;
wherein the means for generating the received signal estimate is configured for generating a training signal estimate corresponding to a first training signal transmitted by a first transmitting device of the plurality of transmitting devices; and
wherein the channel coefficient estimate corresponds to a channel between the first transmitting device and the wireless communication entity.

14. The wireless communication entity of claim 13, further comprising:
means for assigning a first pilot sequence to the first transmitting device for its transmission of the first training signal;
wherein the means for generating the received signal estimate is configured for at least one of:
post-multiplying the received signal estimate with a vector based on the first pilot sequence; or
applying a linear minimum mean square error (LMMSE) estimator to the received signal estimate.

15. The wireless communication entity of claim 13, further comprising:
means for generating a plurality of channel coefficient estimates corresponding to respective ones of the plurality of transmitting devices, the first channel coefficient estimate being among the plurality of channel coefficient estimates.

16. The wireless communication entity of claim 15,
wherein the means for generating the first prediction of the future channel coefficient is configured for generating a plurality of predictions of future channel coefficients based on respective ones of the plurality of channel coefficient estimates, the first prediction of the future channel coefficient being among the plurality of predictions of future channel coefficients.

17. The wireless communication entity of claim 10, further comprising:
means for generating a precoding vector based on the first prediction of the future channel coefficient; and
means for transmitting a message configured according to the generated precoding vector.

18. A wireless communication entity comprising:
means for receiving a reference signal;
means for generating a received signal estimate based on the received reference signal;
means for generating a plurality of channel coefficient estimates based on a wavelet decomposition of the received signal estimate;
means for generating a plurality of predictions of future channel coefficients based on respective ones of the plurality of channel coefficient estimates;
means for generating a precoding matrix based on the plurality of predictions of the future channel coefficients; and
means for transmitting a signal comprising a multiplexed set of messages to the plurality of transmitting devices, the signal configured according to the generated precoding matrix.

19. A non-transitory computer-readable medium storing computer-executable code, comprising code for causing a wireless communication entity to:
receive a reference signal;
generate a received signal estimate based on the received reference signal;
generate a channel coefficient estimate based on a wavelet decomposition of the received signal estimate by calculating a set of approximation coefficients and a set of detail coefficients, the generated channel coefficient estimate corresponding to the set of approximation coefficients; and
generate a first prediction of a future channel coefficient based on the channel coefficient estimate.

20. The non-transitory computer-readable medium of claim 19, wherein the code for causing the wireless communication entity to generate the channel coefficient estimate is configured to utilize a Haar mother wavelet for the wavelet decomposition.

21. The non-transitory computer-readable medium of claim 19, wherein the code for causing the wireless communication entity to generate the first prediction of the future channel coefficient corresponds to a first-order autoregressive model of channel aging.

22. The non-transitory computer-readable medium of claim 19,
wherein the received reference signal comprises a composite training signal corresponding to training signals transmitted by each one of a plurality of transmitting devices;
wherein the code for causing the wireless communication entity to generate the received signal estimate is configured to generate a training signal estimate corresponding to a first training signal transmitted by a first transmitting device of the plurality of transmitting devices; and
wherein the channel coefficient estimate corresponds to a channel between the first transmitting device and the wireless communication entity.

23. The non-transitory computer-readable medium of claim 22, wherein the computer-executable code further comprises code for causing the wireless communication entity to assign a first pilot sequence to the first transmitting device for its transmission of the first training signal,
wherein the code for causing the wireless communication entity to generate the received signal estimate is configured for at least one of:
post-multiplying the received signal estimate with a vector based on the first pilot sequence; or
applying a linear minimum mean square error (LMMSE) estimator to the received signal estimate.

24. The non-transitory computer-readable medium of claim 22, wherein the computer-executable code further comprises code for causing the wireless communication entity to generate a plurality of channel coefficient estimates corresponding to respective ones of the plurality of transmitting devices, the first channel coefficient estimate being among the plurality of channel coefficient estimates.

25. The non-transitory computer-readable medium of claim 24, wherein the code for causing the wireless communication entity to generate the first prediction of the future channel coefficient is configured to generate a plurality of predictions of future channel coefficients based on respective ones of the plurality of channel coefficient estimates, the first prediction of the future channel coefficient being among the plurality of predictions of future channel coefficients.

26. The non-transitory computer-readable medium of claim 19, wherein the computer-executable code further comprises code for causing the wireless communication entity to:

generate a precoding vector based on the first prediction of the future channel coefficient; and transmit a message configured according to the generated precoding vector.

27. A non-transitory computer-readable medium storing computer-executable code, comprising code for causing a wireless communication entity to:

receive a reference signal;

generate a received signal estimate based on the received reference signal;

generate a plurality of channel coefficient estimates based on a wavelet decomposition of the received signal estimate;

generate a plurality of predictions of future channel coefficients based on respective ones of the plurality of channel coefficient estimates;

generate a precoding matrix based on the plurality of predictions of the future channel coefficients; and transmit a signal comprising a multiplexed set of messages to the plurality of transmitting devices, the signal configured according to the generated precoding matrix.

28. A wireless communication entity, comprising:

a processor; and a transceiver communicatively coupled to the processor;

wherein the processor is communicatively coupled to a memory and configured to:

receive, via the transceiver, a reference signal;

generate a received signal estimate based on the received reference signal;

generate a channel coefficient estimate based on a wavelet decomposition of the received signal estimate by calculating a set of approximation coefficients and a set of detail coefficients, the generated channel coefficient estimate corresponding to the set of approximation coefficients; and generate a first prediction of a future channel coefficient based on the channel coefficient estimate.

29. The wireless communication entity of claim 28, wherein the processor, being configured to generate the channel coefficient estimate, is configured to utilize a Haar mother wavelet for the wavelet decomposition.

30. The wireless communication entity of claim 28, wherein the processor, being configured to generate the first prediction of the future channel coefficient, is configured according to a first-order autoregressive model of channel aging.

31. The wireless communication entity of claim 28, wherein the received reference signal comprises a composite training signal corresponding to training signals transmitted by each one of a plurality of transmitting devices;

wherein the processor, being configured to generate the received signal estimate, is further configured to generate a training signal estimate corresponding to a first training signal transmitted by a first transmitting device of the plurality of transmitting devices; and wherein the channel coefficient estimate corresponds to a channel between the first transmitting device and the wireless communication entity.

32. The wireless communication entity of claim 31, wherein the processor is further configured to:

assign a first pilot sequence to the first transmitting device for its transmission of the first training signal;

wherein the processor, being configured to generate the received signal estimate, is configured for at least one of:

post-multiplying the received signal estimate with a vector based on the first pilot sequence; or applying a linear minimum mean square error (LMMSE) estimator to the received signal estimate.

33. The wireless communication entity of claim 31, wherein the processor is further configured to generate a plurality of channel coefficient estimates corresponding to respective ones of the plurality of transmitting devices, the first channel coefficient estimate being among the plurality of channel coefficient estimates.

34. The wireless communication entity of claim 33, wherein the processor, being configured to generate the first prediction of the future channel coefficient, is further configured to generate a plurality of predictions of future channel coefficients based on respective ones of the plurality of channel coefficient estimates, the first prediction of the future channel coefficient being among the plurality of predictions of future channel coefficients.

35. The wireless communication entity of claim 28, wherein the processor is further configured to:

generate a precoding vector based on the first prediction of the future channel coefficient; and transmit, via the transceiver, a message configured according to the generated precoding vector.

36. A wireless communication entity comprising:

a processor; and a transceiver communicatively coupled to the processor;

wherein the processor is communicatively coupled to a memory and configured to:

receive a reference signal;

generate a received signal estimate based on the received reference signal;

generate a plurality of channel coefficient estimates based on a wavelet decomposition of the received signal estimate;

generate a plurality of predictions of future channel coefficients based on respective ones of the plurality of channel coefficient estimates;

generate a precoding matrix based on the plurality of predictions of the future channel coefficients; and transmit, via the transceiver, a signal comprising a multiplexed set of messages to the plurality of transmitting devices, the signal configured according to the generated precoding matrix.

* * * * *